United States Patent [19]
Newman

[11] Patent Number: 6,112,783
[45] Date of Patent: Sep. 5, 2000

[54] ROUTER GUIDE AND CLAMPING APPARATUS

[76] Inventor: Roger R. Newman, 20 Lytton Boulevard, Toronto, Ontario, Canada, M4R 1L1

[21] Appl. No.: 09/207,760

[22] Filed: Dec. 9, 1998

[51] Int. Cl.[7] .................................................. B27M 3/00
[52] U.S. Cl. ................................ 144/144.52; 144/144.1
[58] Field of Search ............................ 144/135.2, 135.3, 144/137, 144.52, 253.5; 409/175, 181, 182

[56] References Cited

U.S. PATENT DOCUMENTS

| | | | |
|---|---|---|---|
| 4,095,633 | 6/1978 | Kimball et al. ..................... | 144/144 R |
| 4,291,735 | 9/1981 | Siliken ................. | 144/136 C |
| 4,984,613 | 1/1991 | Szeto ........................ | 144/27 |
| 5,052,454 | 10/1991 | Meinhardt ........................ | 144/144.5 R |
| 5,333,657 | 8/1994 | Hart ........................ | 142/24 |
| 5,492,160 | 2/1996 | McCracken ............................ | 144/367 |
| 5,494,089 | 2/1996 | Lubbe .................. | 144/144 R |
| 5,533,556 | 7/1996 | Whitney .............................. | 144/144.52 |
| 5,562,136 | 10/1996 | Blackshear ....................... | 144/144.1 R |

*Primary Examiner*—Joseph J. Hail, III
*Assistant Examiner*—Dermott J. Cooke
*Attorney, Agent, or Firm*—Bereskin & Parr

[57] ABSTRACT

A combined router guide and clamping apparatus for enabling the routing of small rectangular holes, grooves, recesses, rabbets, mortices and tenons, in a controlled and precise manner, on large or small blocks of wood as well as the sides or ends of boards. The combined router guide and clamping apparatus comprises: a working platform having a platform area for receiving a router base thereon; a base unit secured to the working platform, underneath the working platform and including clamping means, which includes at least one adjustable clamp, moveable relative to the working platform, for securing a workpiece in the base unit relative to the working platform; and a fence means on the working platform and including at least one adjustable fence for guiding the router base on the router platform area. The clamping assembly includes a pair of clamping jaws and front and rear force transfer bars which isolate the clamping forces from the working platform and the base unit.

19 Claims, 20 Drawing Sheets

FIG. 13A FIG. 13B
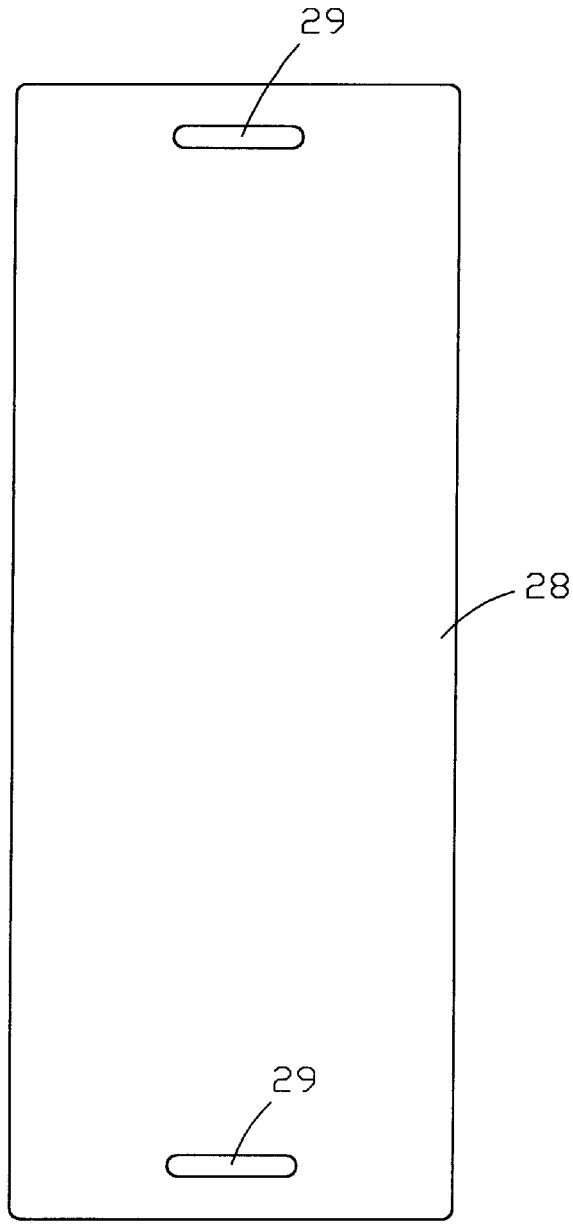
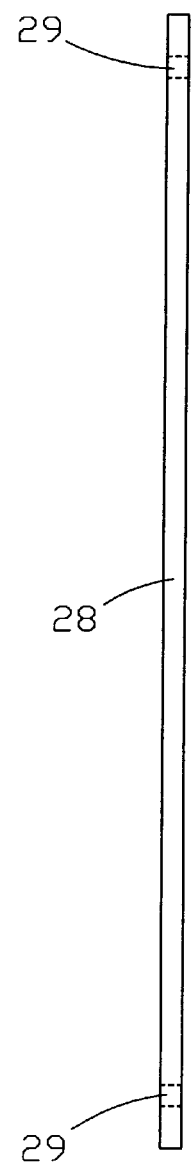
FIG. 13C
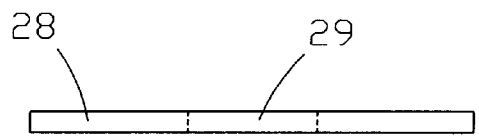

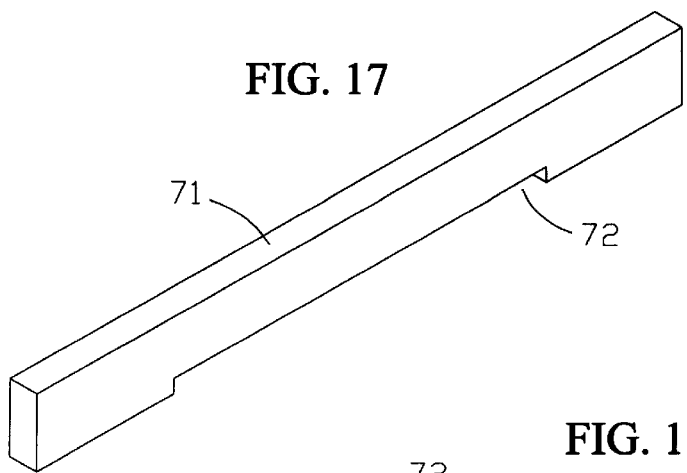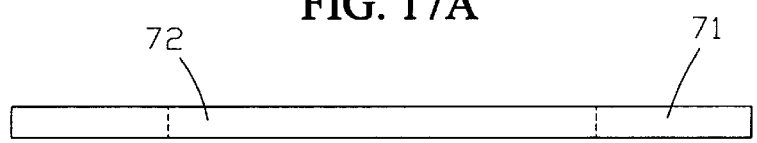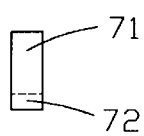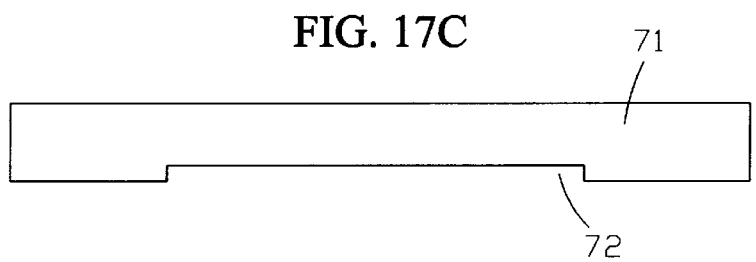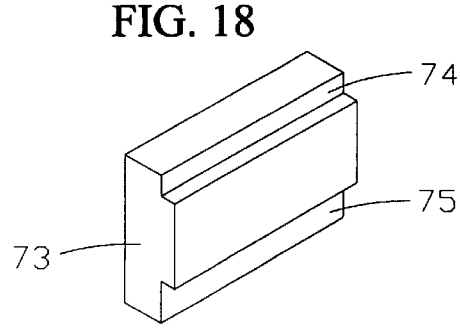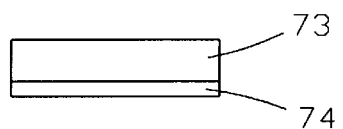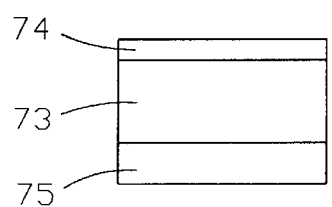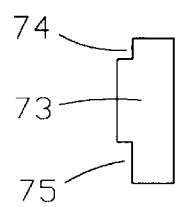

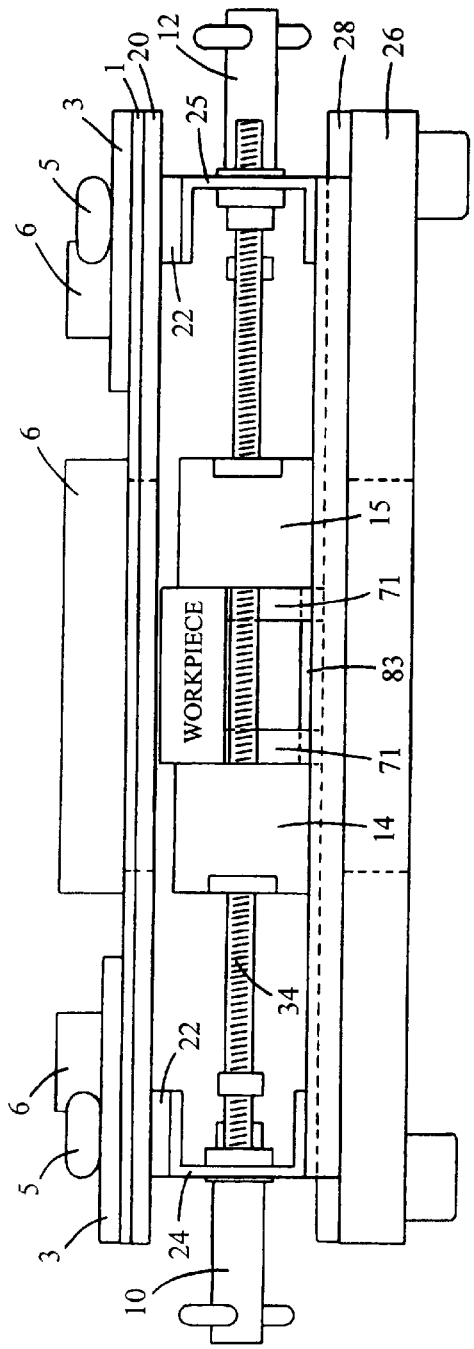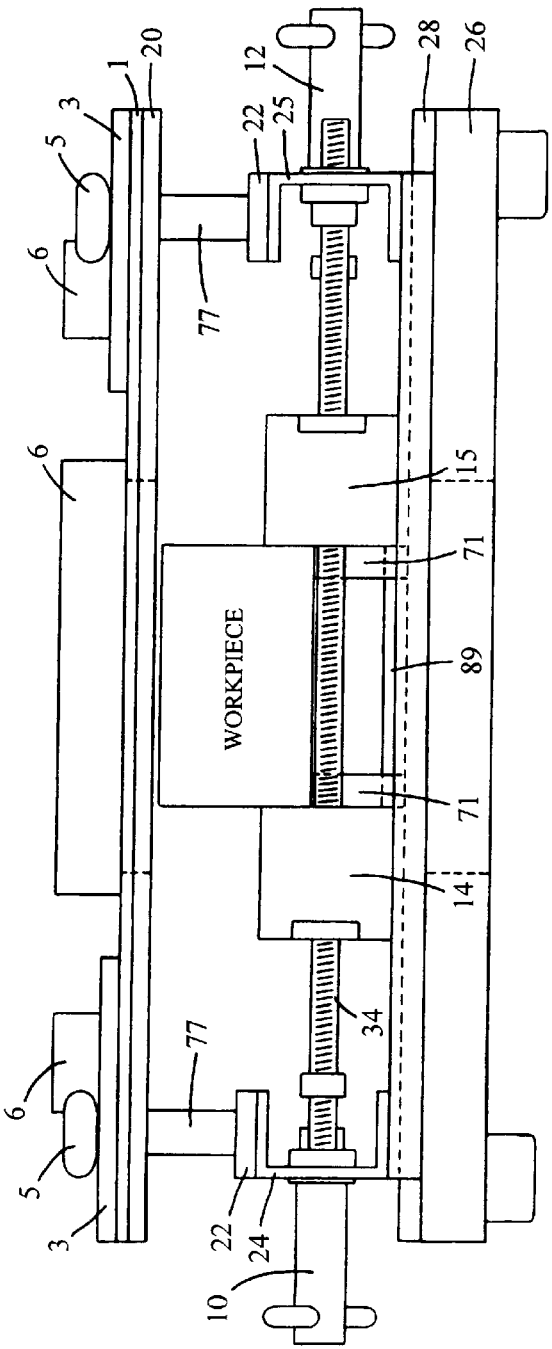

ROUTER GUIDE AND CLAMPING APPARATUS

FIELD OF THE INVENTION

This invention relates to a combined router guide and clamping apparatus for enabling the routing of small rectangular holes, grooves, or recesses, in a controlled and precise manner, on large or small blocks of wood as well as the sides or ends of boards. In particular, the present invention provides an integral clamping apparatus which is self-contained and does not depend in any way on its mounting base for the transfer of any force.

BACKGROUND OF THE INVENTION

When routing small rectangular holes, grooves, or recesses into small blocks of wood, or onto the sides or ends of boards, it is desirable to include an integral clamping assembly which can be readily adjusted so that a precise cut can be made.

One example of a prior art design is found in Spielman, P., *The New Router Handbook* (New York: Sterling Publishing Co., 1993) at pp. 352–354. This prior art device, referred to as The WoodRat™, consists of a large horizontal extruded-aluminum body or base. Inside this horizontal extruded-aluminum body is another extrusion which functions as a work-holding carriage. As shown in illus. 32-20 to 32-23, and as explained at p. 353, the combination of router movement and/or workfeed movement provides the necessary flexibility to produce numerous controlled joinery cuts. While this prior art device is suitable for forming a variety of tenons and other types of joints onto the ends of boards, it does not appear to be particularly suited for clamping and routing onto very small or thin workpieces. That is to say, due to the nature of the clamping action, it would seem that the workpiece would need to be of sufficient thickness so that the full length of the jaws contacts the workpiece, which would rule out the clamping of small blocks and thinner workpieces on this device. Furthermore, the jaws of the clamping assembly are oriented substantially vertically so that workpieces cannot be easily positioned for routing operations along their length. In order to do so, it would appear that a workpiece would have to be held horizontally and be clamped only by its two ends, which would require that the ends of the workpiece be made true and perpendicular to its length for a reliable grip. Also the length of the workpiece would be limited by the maximum distance between the Woodrat™ jaws. As well, the jaws of the clamping assembly appear to be metal and they will have to be located sufficiently below the router baseplate so that the blade of the router will not make contact with them when passing underneath. Additionally, the movement that the router can make in order to form the tenons and various other types of joints is limited. Finally, the WoodRat™ is a wall mounted device which is not easily portable.

SUMMARY OF THE INVENTION

The present invention provides an apparatus for clamping boards and large or small blocks of wood to enable the routing of small rectangular holes, grooves, recesses, rabbets, mortices, and tenons, in a controlled and precise manner.

In a first aspect, the present invention provides an apparatus for use with a portable router having a base and a router bit extendable from said base, the apparatus comprising:

(1) a working platform having a platform area for slidably supporting a router base thereon and defining an opening for access, in use, to a workpiece;

(2) a base unit secured to the working platform, underneath the working platform and including clamping means comprising a pair of opposed and adjustable clamping jaws, each of which is, movable relative to the working platform, for securing said workpiece in the base unit in one of a plurality of lateral positions relative to the opening in the working platform; and (3) a fence means on the working platform and including at least one adjustable fence for guiding the router base on the platform area.

In the preferred embodiment, the working platform defines an opening for receiving a workpiece. Additionally, the fence means comprises a plurality of fences positionable around the opening, for guiding a router on any side of a workpiece.

Preferably, the opening in the working platform is generally rectangular and includes a front edge and a rear edge, wherein the clamping jaws comprise a front clamping jaw and a rear clamping jaw and wherein the clamping means includes screw means engaging the front and rear clamping jaws, for displacing the front clamping jaw away from the front edge and the rear clamping jaw away from the rear edge, to clamp a workpiece.

In the preferred embodiment, the screw means comprises, for each of the clamping jaws, a pair of threaded rods rotatably mounted in the base unit and engaging threaded bores in the corresponding clamping jaw for movement thereof.

The screw means comprises a first pair of parallel threaded rods engaging the rear clamping jaw and including adjustment handles at the front of the apparatus, and a second pair of threaded rods, parallel to one another and to the first pair of threaded rods engaging the front clamping jaw, and including adjustment handles at the rear of the apparatus.

In one preferred embodiment, the first pair of parallel threaded rods are located outside of the second pair of parallel threaded rods, and all of the parallel threaded rods are located generally coplanar and below the working platform.

Each of the clamping jaws is generally rectangular, the front clamping jaws including clearance holes for passage of the first pair of threaded rods and the rear clamping jaws including clearance holes for passage of the second pair of threaded rods.

More preferably, the base unit comprises a base plate and front and rear force transfer bars secured thereto, wherein the working platform is secured on top of the force transfer bars.

Advantageously, the front handles include bearing surfaces for abutting the front force transfer bar, the rear handles include bearing surfaces for abutting the rear force transfer bar, the first pair of threaded rods include compression collars for abutting an inside surface of the rear force transfer bar and the second pair of threaded rods includes compression collars for abutting the inside of the front force transfer bar, the compression collars being adjusted so that loads applied to the threaded shafts from the clamping jaws are distributed by the handles and the compression collars between the front and rear force transfer bars.

BRIEF DESCRIPTION OF THE DRAWINGS

For a better understanding of the present invention, and to show more clearly how it may be carried into effect, reference will now be made, by way of example, to the accompanying drawings which show a preferred embodiment of the present invention.

FIGS. 13A–13C show a top view, a side view, and a front view, respectively, of a removable tray of the apparatus;

FIG. 17 is an isometric view of a long mount;

FIGS. 17A–17C are a top view, an end view, and a side view, respectively, of the long mount shown in FIG. 17;

FIG. 18 is an isometric view of a short mount;

FIGS. 18A–18C are a top view, a front view, and an end view, respectively, of the short mount shown in FIG. 18;

FIGS. 21A–21C show a top view, width view, and length view, respectively, of a typical equalizing plate;

FIGS. 22A–22C show a top view, side view, and an end view, respectively, of a typical equalizing shim;

FIG. 23 shows a side view of the apparatus with a workpiece clamped between the jaws of the clamping assembly;

FIG. 24 shows another side view of the apparatus with a larger workpiece clamped between the jaws of the clamping assembly and height extenders raising the working platform higher above the clamping assembly;

DETAILED DESCRIPTION OF THE INVENTION

Note that, for the purposes of this patent specification, the entire clamping and platform apparatus is also referred to as the "masterguide".

Figure 1:
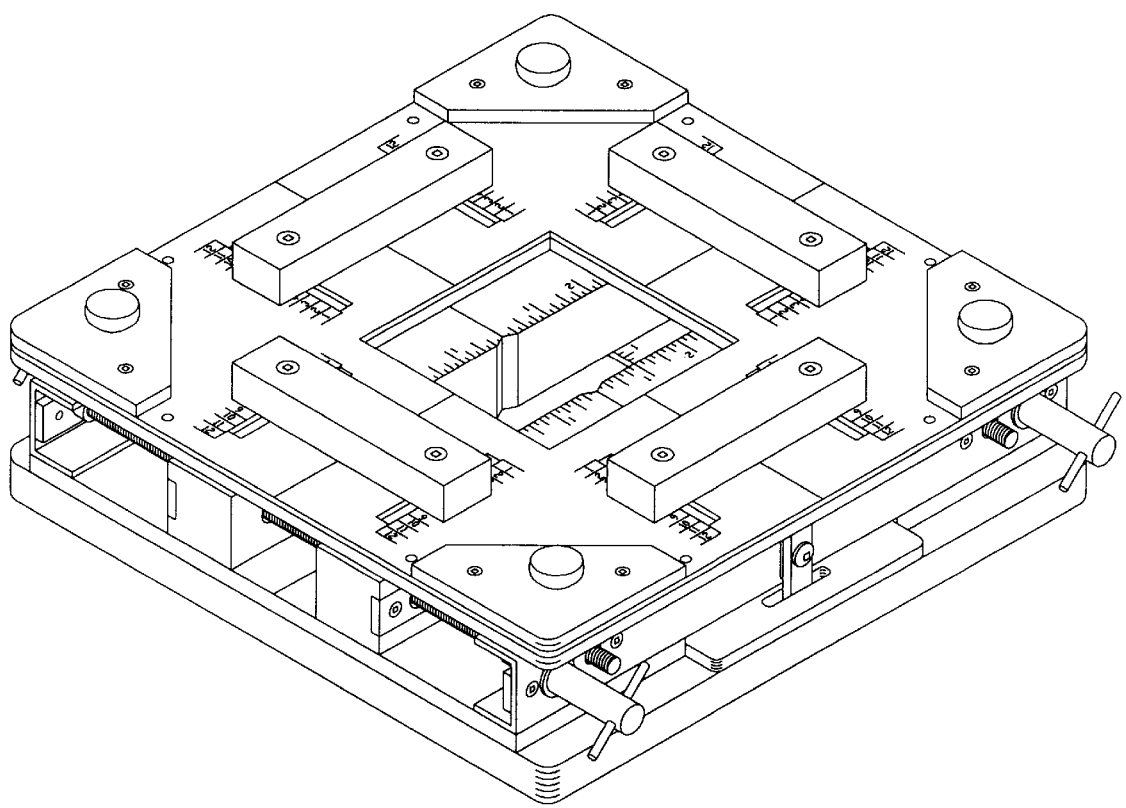
FIG. 1 shows an isometric view of the apparatus of the present invention.
Figure 2A:
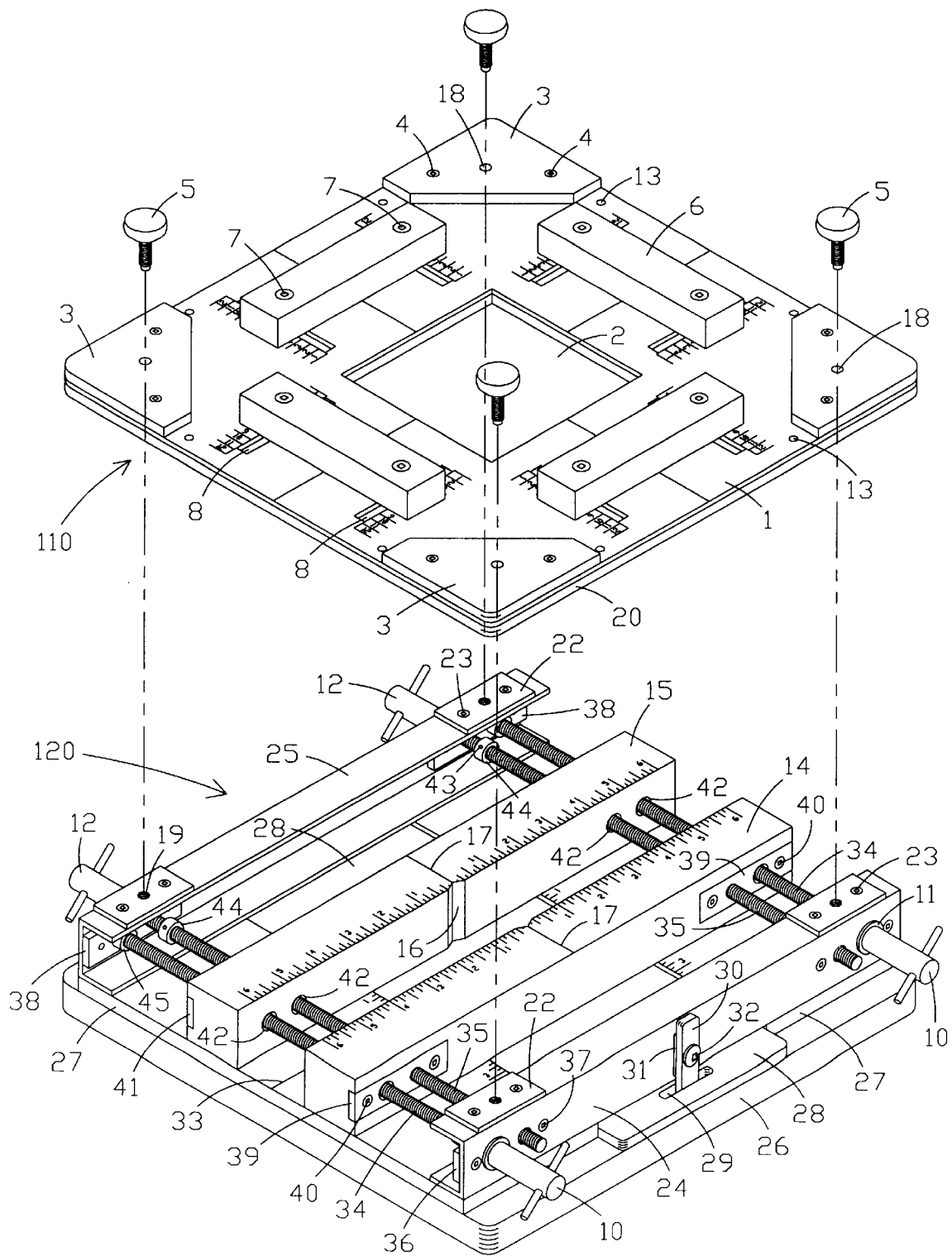
FIG. 2A shows an exploded view of the apparatus of FIG. 1, showing the working platform removed and spaced above the clamping assembly.
Figure 2B:
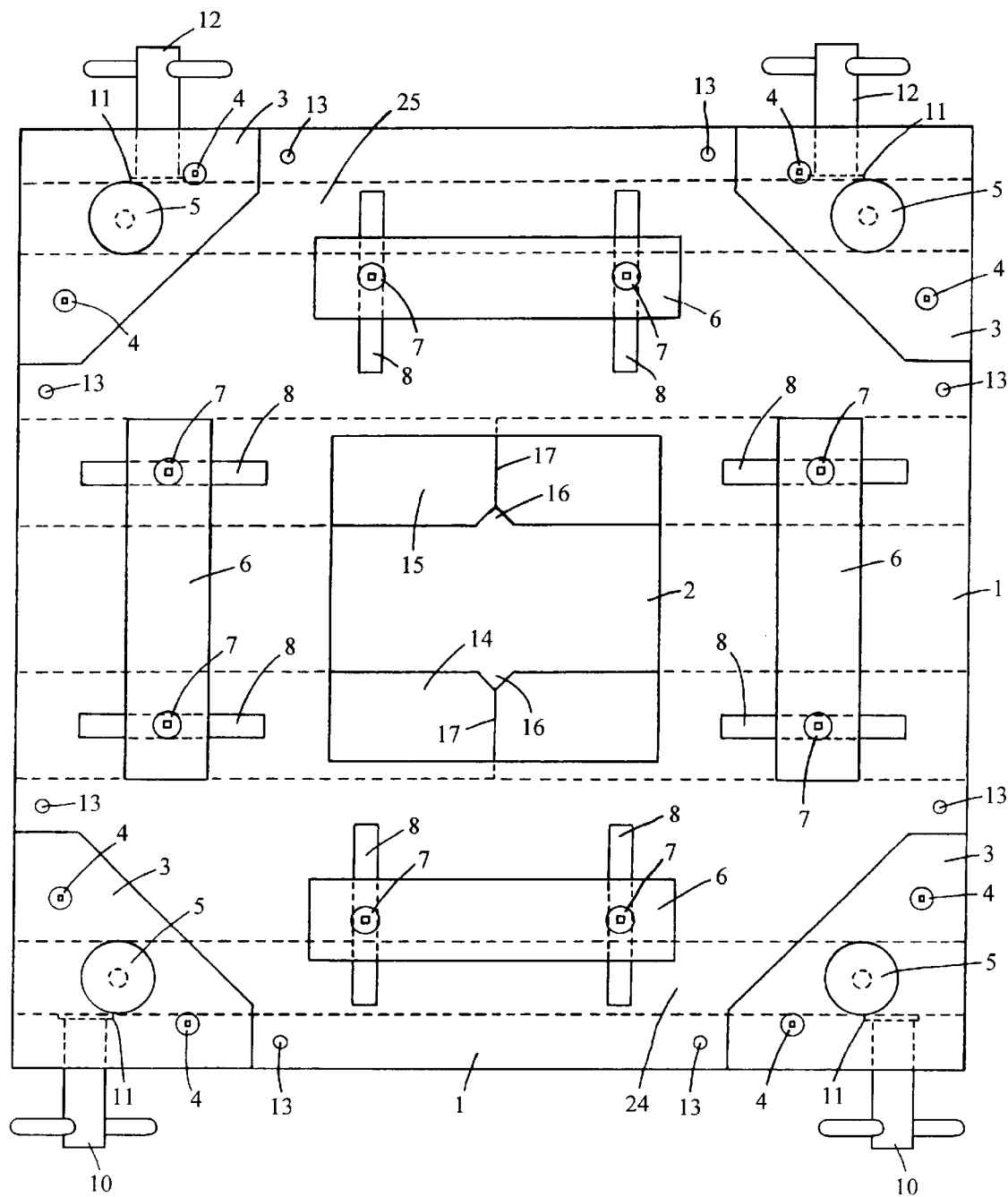
FIG. 2B shows a top view of the apparatus taken along the line II—II indicated in FIG. 7 showing various details of the working platform.

Referring to FIGS. 1, 2A and 2B, the masterguide or apparatus has a platform area 1 which has a large rectangular hole 2 at its center. All routing activity is contained within the rectangular hole 2. A standard hand-held router, having a 6" diameter baseplate, would sit and slide around in the middle of the platform area 1, where it would be limited and controlled by each of four adjustable fences 6. In the platform area 1 underneath each adjustable fence 6 is a pair of slots 8. Each adjustable fence 6 is slidable along the length of each pair of slots 8.

Figure 3:
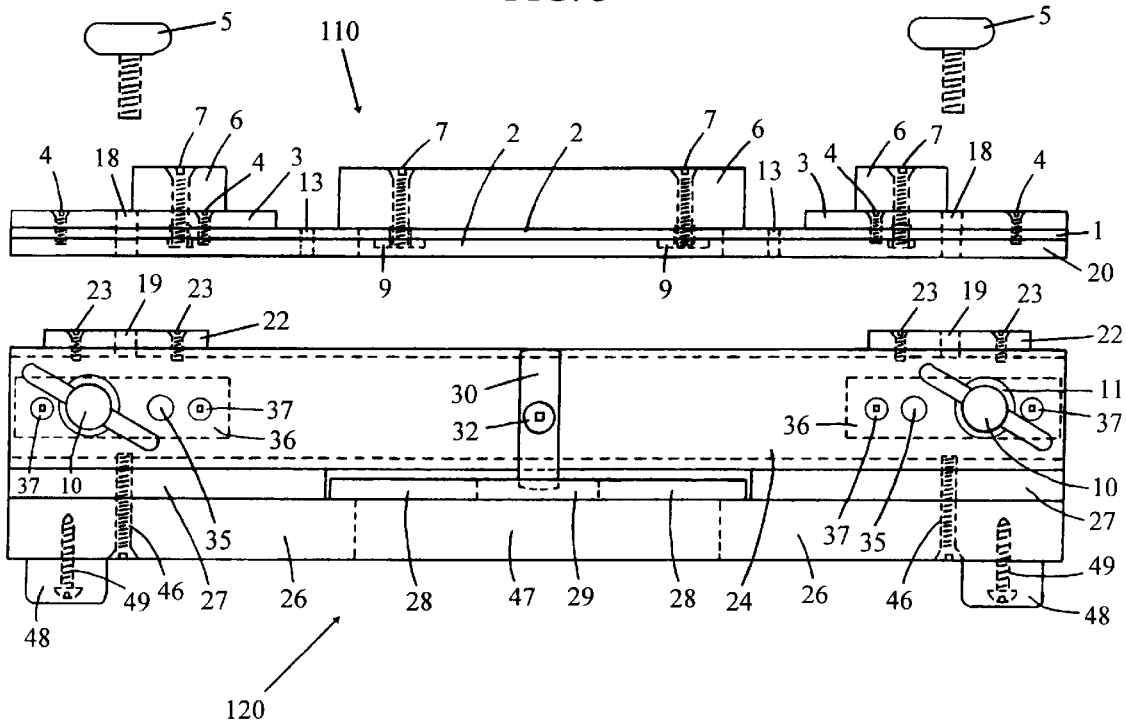
FIG. 3 is a front view of the apparatus with the working platform shown spaced above the clamping assembly.
Figure 4:
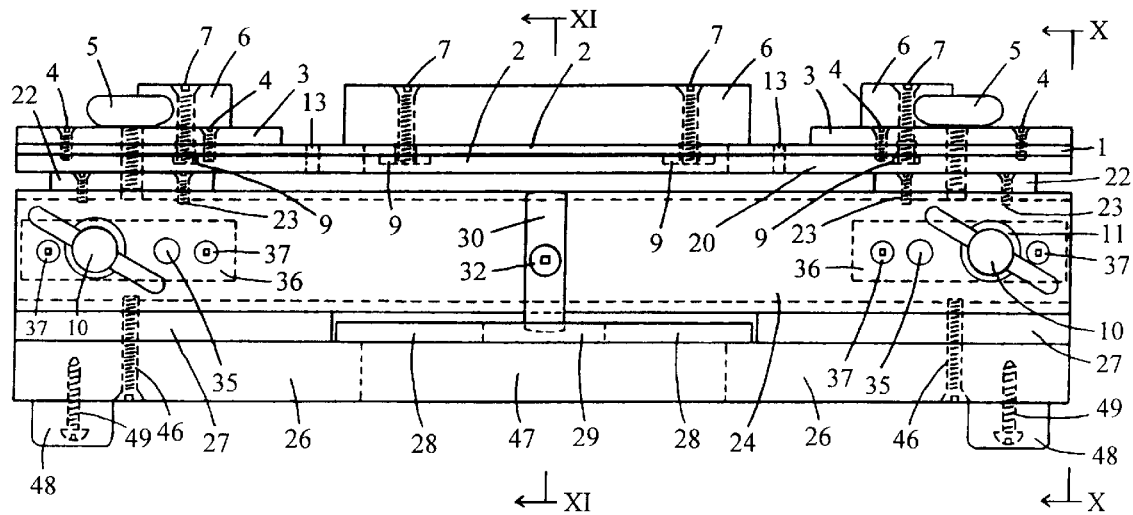
FIG. 4 is a front view of the assembled apparatus taken from line VII—VII indicated in FIG. 7.
Figure 5:
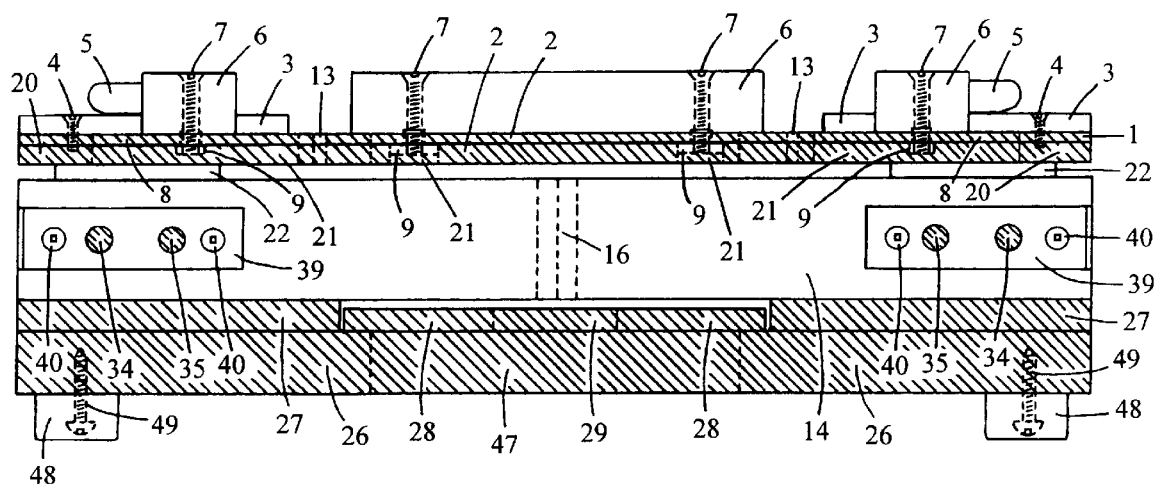
FIG. 5 is a cross-sectional front view of the apparatus taken along the line VIII—VIII also indicated in FIG. 7.
Figure 6:
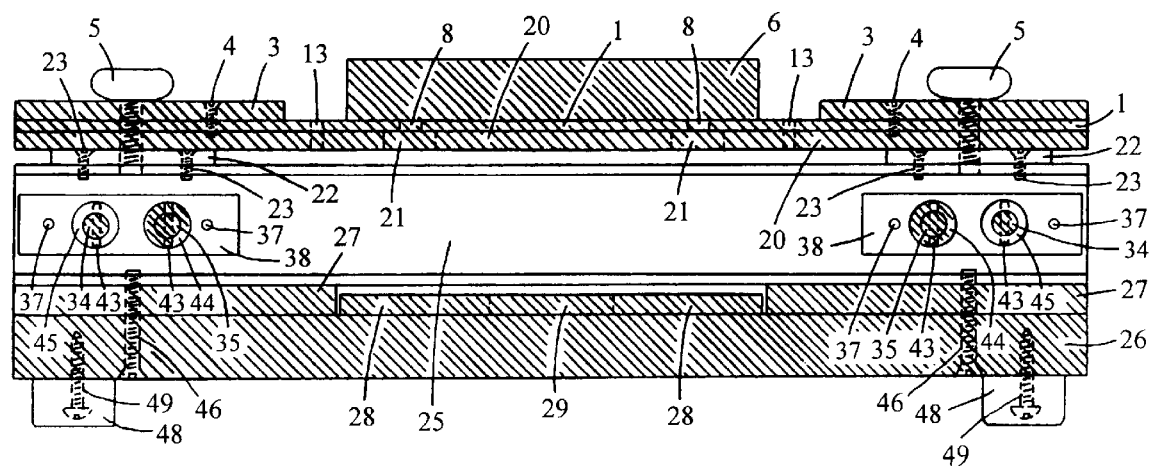
FIG. 6 is another cross-sectional front view of the apparatus taken along the line IX—IX indicated in FIG. 7.

Now referring to FIGS. 2A, 2B, and 3, glued onto the underside of the platform area 1 is a backing plate 20 which also has a large rectangular hole 2 at its center. The backing plate 20 and platform area 1 together form a working platform 110. The backing plate 20 has wide slots 21 (shown in FIGS. 5 and 9) located underneath each of the slots 8 in the platform area 1. These wide slots 21 accommodate the heads of T-nuts 9 which screw onto the tips of flat-headed machine screws 7 each passing through an adjustable fence 6, a slot 8, and a wide slot 21, to secure each adjustable fence 6 onto the platform area 1. However, each of the adjustable fences 6 is free to move back and forth until the flat-headed machine screws 7 are tightened. Referring back to FIG. 2B, eight small holes 13 located around the perimeter of the platform area 1 are provided so that the working platform 110 can be screwed down directly onto a workpiece if desired, when the working platform 110 is used independently from base unit 120.

Still referring to FIGS. 2A, 2B, and 3, located in each of the four corners on top of the platform area 1 are clampdown plates 3 which are fastened onto the platform area 1 by means of flat-headed machine screws 4. A clearance hole 18 is drilled through each triangular clampdown plate 3, and extends also through the platform area 1 and the backing plate 20. Four screw knobs 5 are placed in the clearance holes 18 and then screwed into threaded holes 19 located in four attachment plates 22 of the base unit 120. While the working platform 110 and the base unit 120 are usually fastened together, as explained, the working platform 110 can also be used independently.

Figure 11:
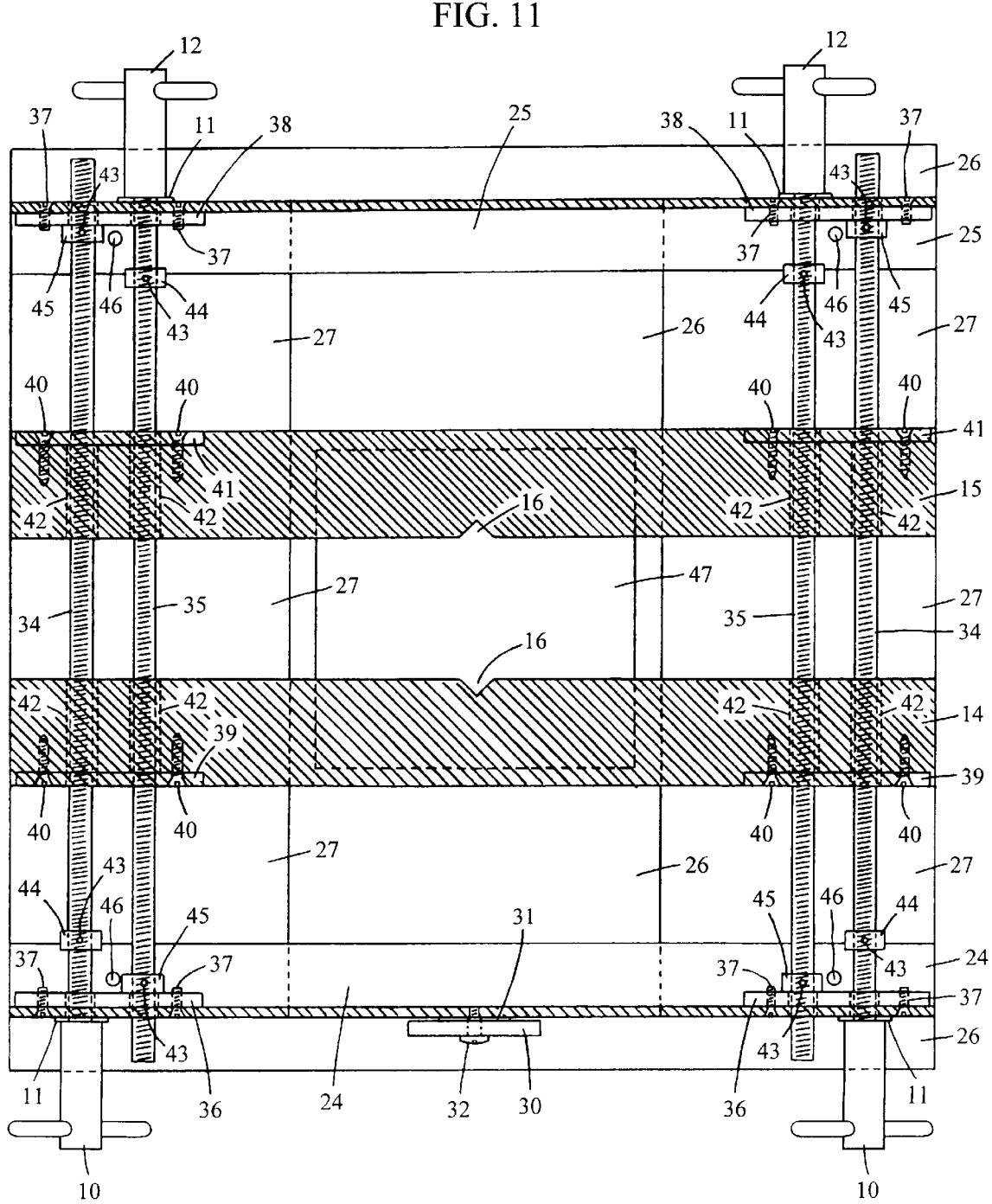
FIG. 11 is another cross-sectional top view of the apparatus (with removable tray removed) taken along the line V—V as indicated in FIG. 7.

Now referring to FIGS. 2A, 3, and 11, the base 26 of the base unit 120 also has a large rectangular hole 47 at its center, which substantially matches the rectangular hole 2 of the working platform 110. Located on top of the base 26 are two clamp mounting blocks 27 which serve to raise the entire clamp assembly above the base 26. Attached onto the clamp mounting blocks 27 are the front and rear force transfer bars 24 and 25, both of which are channel-shaped. The front and rear force transfer bars 24 and 25, as well as the two clamp mounting blocks 27, are fastened to the base 26 by means of the flat-headed machine screws 46. Located inside each end of the front and rear force transfer bars 24, 25 are the front and rear bearing plates 36, 38 which are fastened onto the force transfer bars 24, 25 by means of flat-headed machine screws 37. Located in the middle area between the front and rear force transfer bars 24, 25 are the front and rear clamp jaws 14, 15, the ends of which rest on the clamp mounting blocks 27.

Now referring to FIGS. 4–8, and 11, recessed into the backs of the front and rear clamp jaws 14, 15 are the front and rear jaw plates 39, 41 which are fastened onto the clamp jaws 14, 15 by means of flat-headed wood screws 40.

Front handles 10 are attached to the outer threaded rods 34 which pass through clearance holes in the front force transfer bar 24 and in the front bearing plates 36. These threaded rods 34 then pass through clearance holes in the front jaw plates 39, then through loose clearance holes 42 in both the front and rear clamp jaws 14, 15, before screwing into threaded holes in the rear jaw plates 41. The far ends of the outer threaded rods 34 finally pass through clearance holes in the rear bearing plates 38 and in the rear force transfer bar 25, which acts as a bearing.

The rear handles 12 are attached to inner threaded rods 35, which pass through clearance holes in the rear force transfer bar 25 and in the rear bearing plate 38. These threaded rods 35 then pass through clearance holes in the rear jaw plates 41, then through loose clearance holes 42 in both the front and rear clamp jaws 14, 15, before screwing into threaded holes in the front jaw plate 39. The far ends of the inner threaded rods 35 finally pass through clearance holes in the front bearing plates 36 and in the front force transfer bar 24, which again acts as a bearing.

Figure 7:
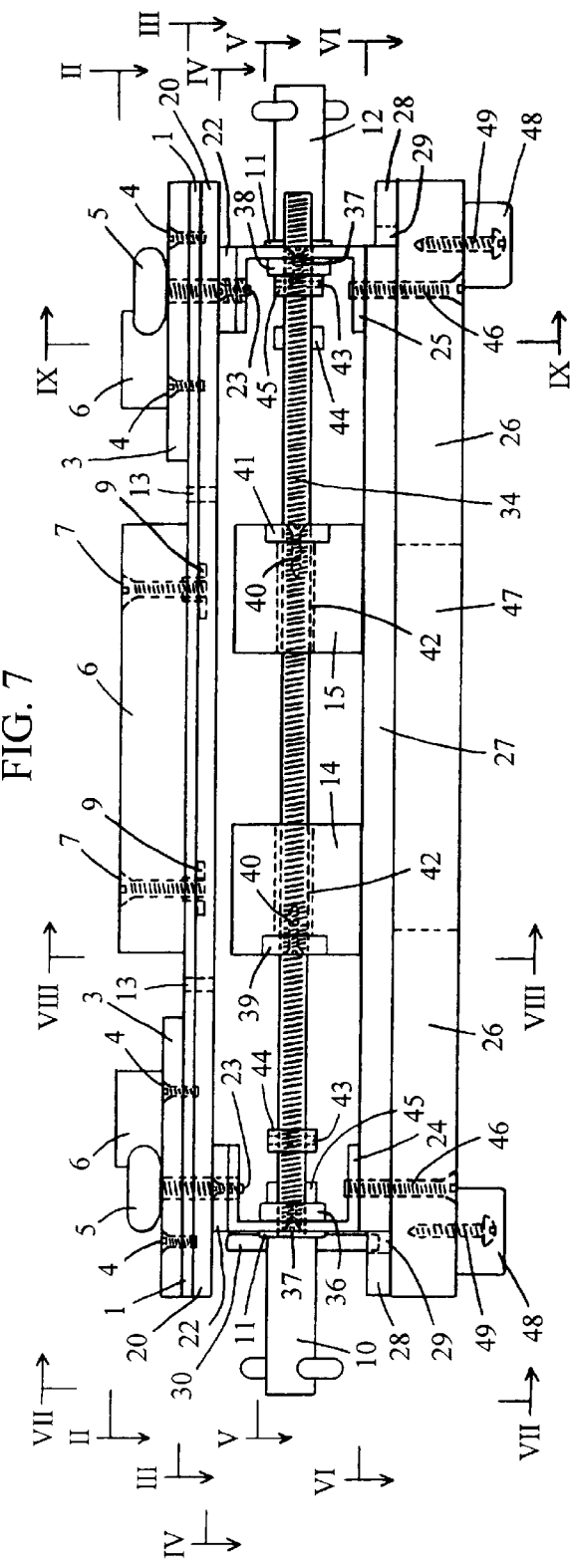
FIG. 7 is a side view of the apparatus taken along the line X—X indicated in FIG. 4.
Figure 8:
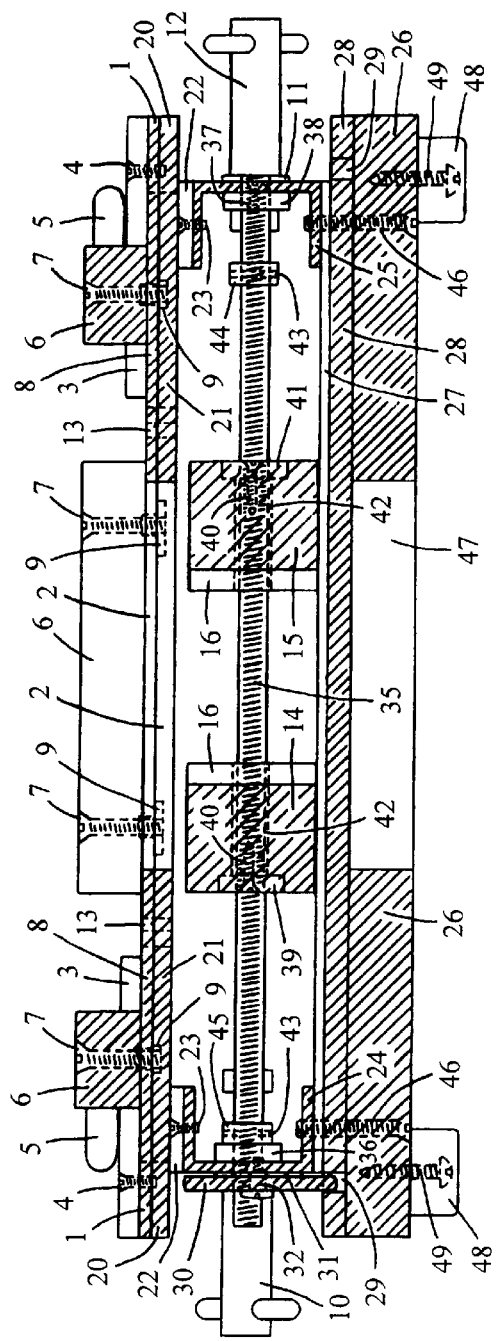
FIG. 8 is a cross-sectional side view of the apparatus taken along the line XI—XI indicated in FIG. 4.

The front handles 10 operate the rear clamp jaw 15, and the rear handles 12 operate the front clamp jaw 14. Located internally from each front handle 10, and rear handle 12, are washers 11 (FIGS. 7 and 8). Also, located near the front handles 10 on the outer threaded rods 34 are limit collars 44 which limit the amount of excess movement by the outer threaded rods 34, and by the rear clamp jaw 15. Similarly, near the rear handles 12 on the inner threaded rods 35 are limit collars 44 which limit the amount of excess movement by the inner threaded rods 35, and by the front clamp jaw 14.

Still referring to FIGS. 4–8, and 11, located near the far ends of the outer threaded rods 34 are compression collars 45. These compression collars 45 are strategically placed so that they will contact the rear bearing plates 38 at precisely the same instant that the front handles 10, via washers 11, contact the front force transfer bar 24. Similarly, near the far ends of the inner threaded rods 35 are compression collars 45. These compression collars are strategically placed so that they will contact the front bearing plates 36 at precisely the same instant that the rear handles 12, via washers 11, contact the rear force transfer bar 25. All of the limit collars 44, and all of the compression collars 45, are fastened onto the threaded rods 34 and 35 by means of pins or screws 43. This arrangement of the collars 45 is intended to ensure that loads from the jaws 14, 15 are transferred evenly to the front and rear force transfer bars 24, 25.

Figure 9:
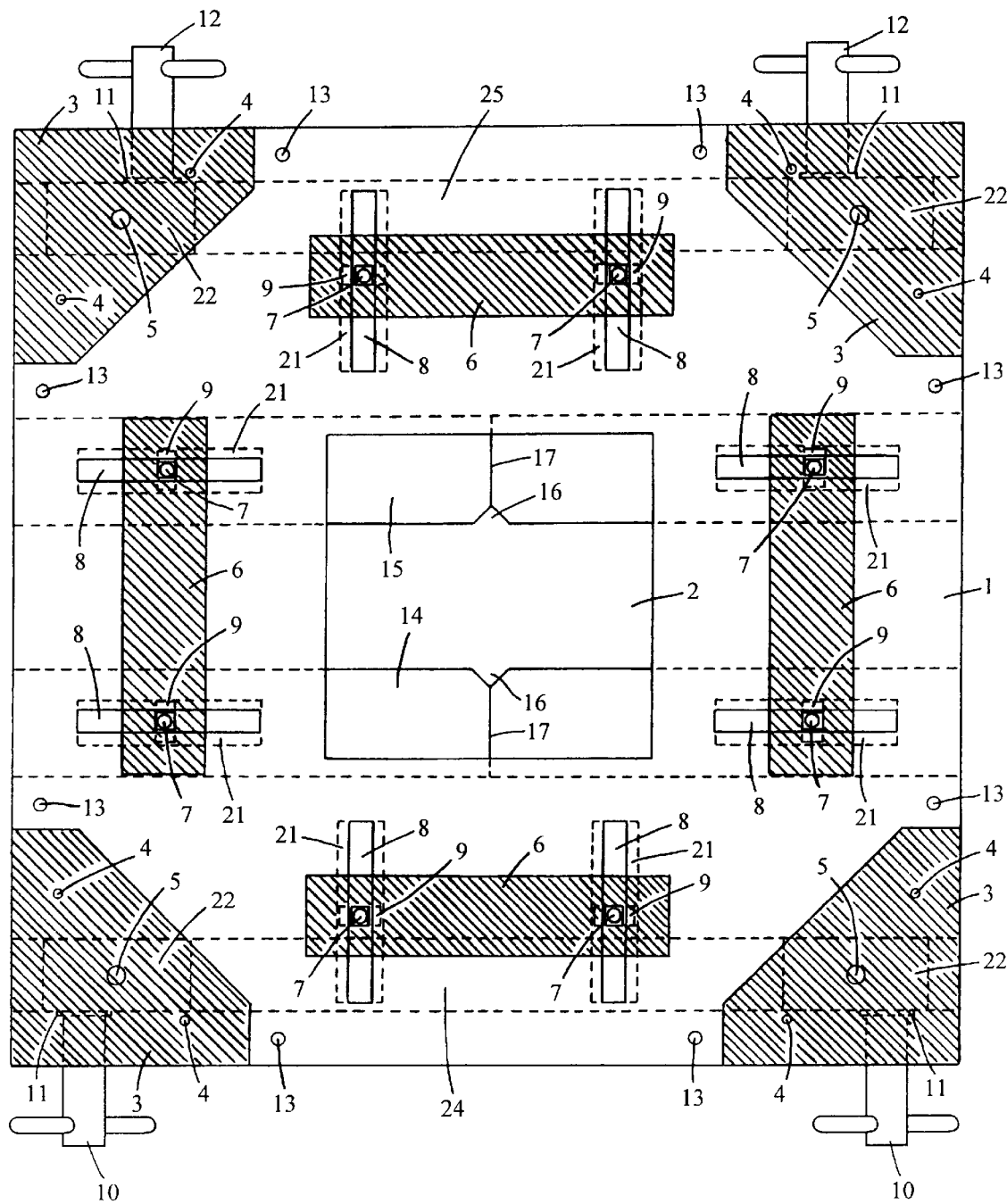
FIG. 9 is a cross-sectional top view of the apparatus taken along the line III—III indicated in FIG. 7.
Figure 10:
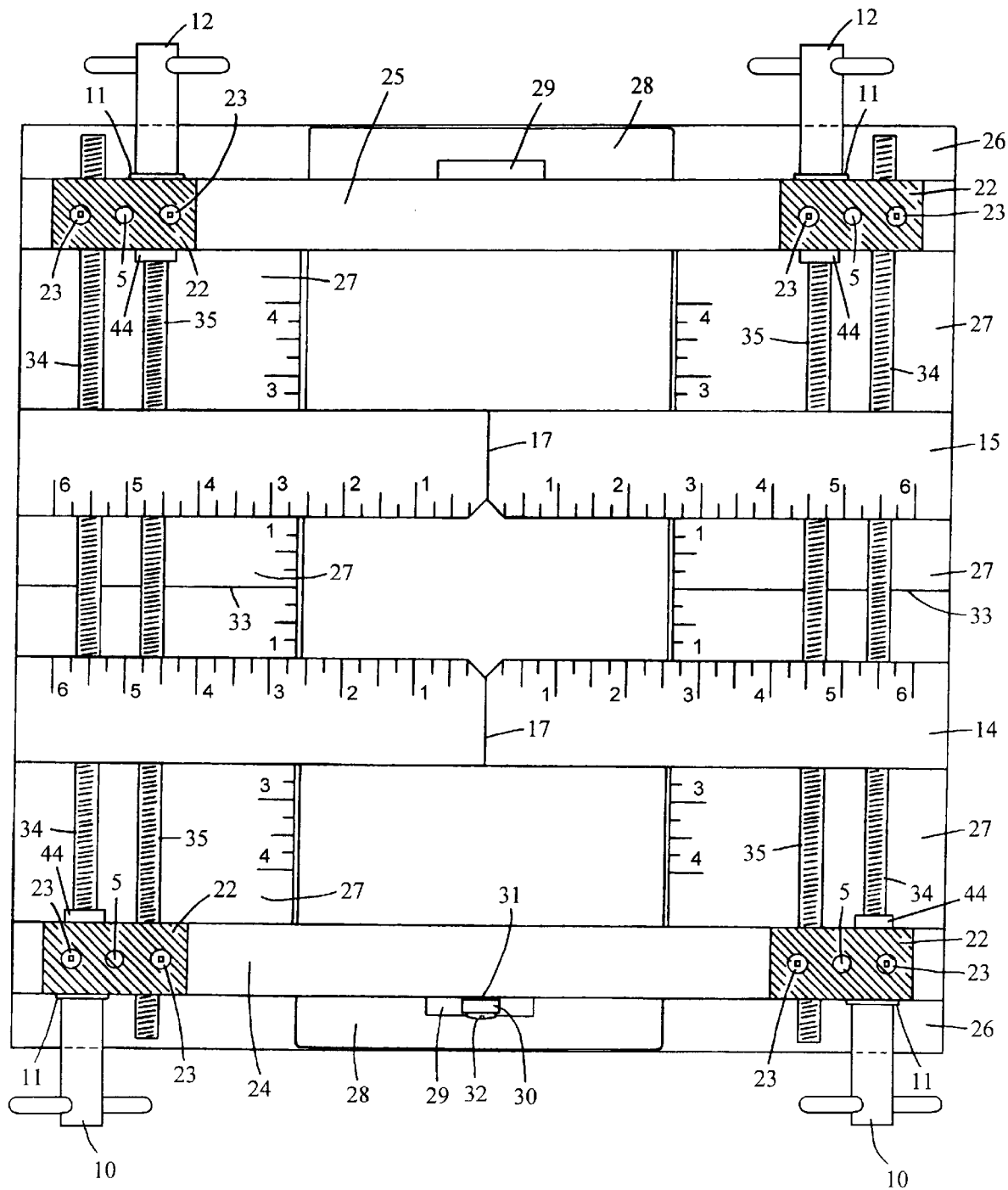
FIG. 10 is a cross-sectional top view of the apparatus taken along the line IV—IV also indicated in FIG. 7.

Now referring to FIG. 9, the front and rear clamp jaws 14, 15 are V-notched 16 on their forward sides for the clamping of round workpieces. In FIG. 10, each front and rear clamp jaw 14, 15 is shown with calibration markings on both sides of center line 17. The calibration markings and a center line 33 on the top surface of each mounting block 27 are provided to indicate the front to rear positions of the clamp jaws 14,15. The four attachment plates 22 are fastened onto the tops of the front and rear force transfer bars 24, 25 by means of flat-headed machine screws 23. Located underneath the front and rear force transfer bars 24, 25 is a removable tray 28 which slides in between the two clamp mounting blocks 27 to cover the large rectangular hole 47 in the center of the base 26.

Figure 12:
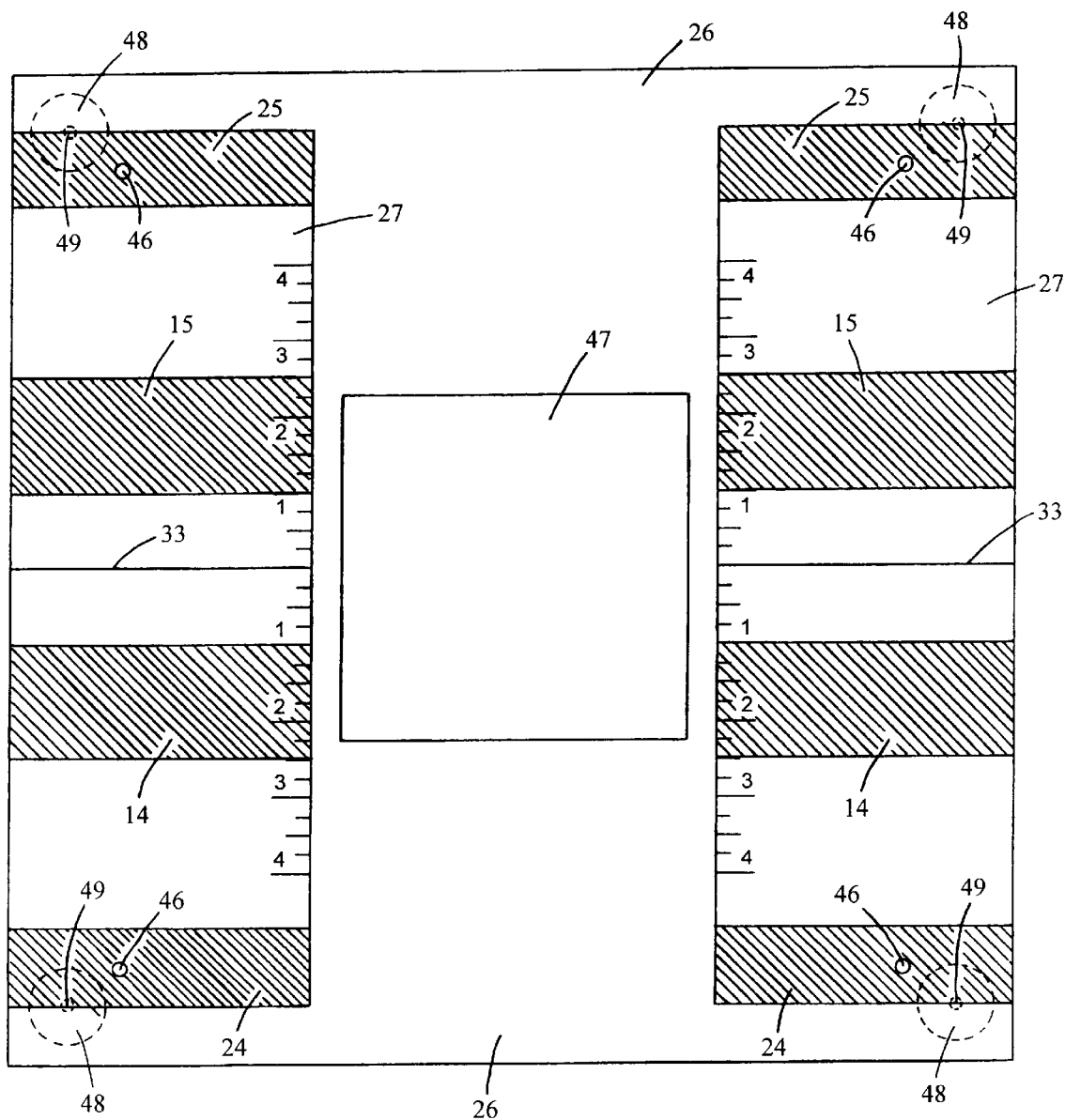
FIG. 12 is yet another cross-sectional top view of the apparatus (with removable tray removed) taken along the line VI—VI indicated in FIG. 7.

Now referring to FIGS. 11 and 12, the removable tray 28 has been removed to show the large rectangular hole 47 in the center of the base 26. The removable tray 28 is shown in various views in FIGS. 13A–13C.

At each end of the removable tray 28 is a slot 29 which is used to secure the tray 28 when it is installed into the base unit 120. The tray 28 can be slid into the base unit 120 in either direction, or upside down. Referring back to FIG. 11, located in the middle of the front force transfer bar 24 is a turn button 30, which is fastened onto the front force transfer bar 24 by means of a special round-headed machine screw 32 with a shoulder. This is so that the turn button 30 will be free to rotate when the special screw 32 is fully tightened. The back surface of the turn button 30 has soft plastic 31 glued onto it. The soft plastic 31 provides some resistance so that the turn button 30 will stay in any position, but it will also allow the turn button 30 to be turned manually. When the turn button 30 is turned vertically, it will fit into the slots 29 of the removable tray 28 and lock the tray 28 in place. When the turn button 30 is turned horizontally, the removable tray 28 can be installed or removed. For smaller workpieces, the removable tray 28 can be installed. For larger or longer workpieces which would project below the removable tray 28, the tray 28 is removed. Clamping longer workpieces vertically in the masterguide is possible by placing the masterguide over an open area, as explained further below.

Normally, the masterguide is placed on a work surface, such as a table, for use. Shown in FIG. 12 are four rubber feet 48 which are fastened onto the base 26 by means of round-headed wood screws 49. These rubber feet 48 raise the base 26 up above the work surface and also help prevent the masterguide from sliding around on the work surface during use.

Figure 14:
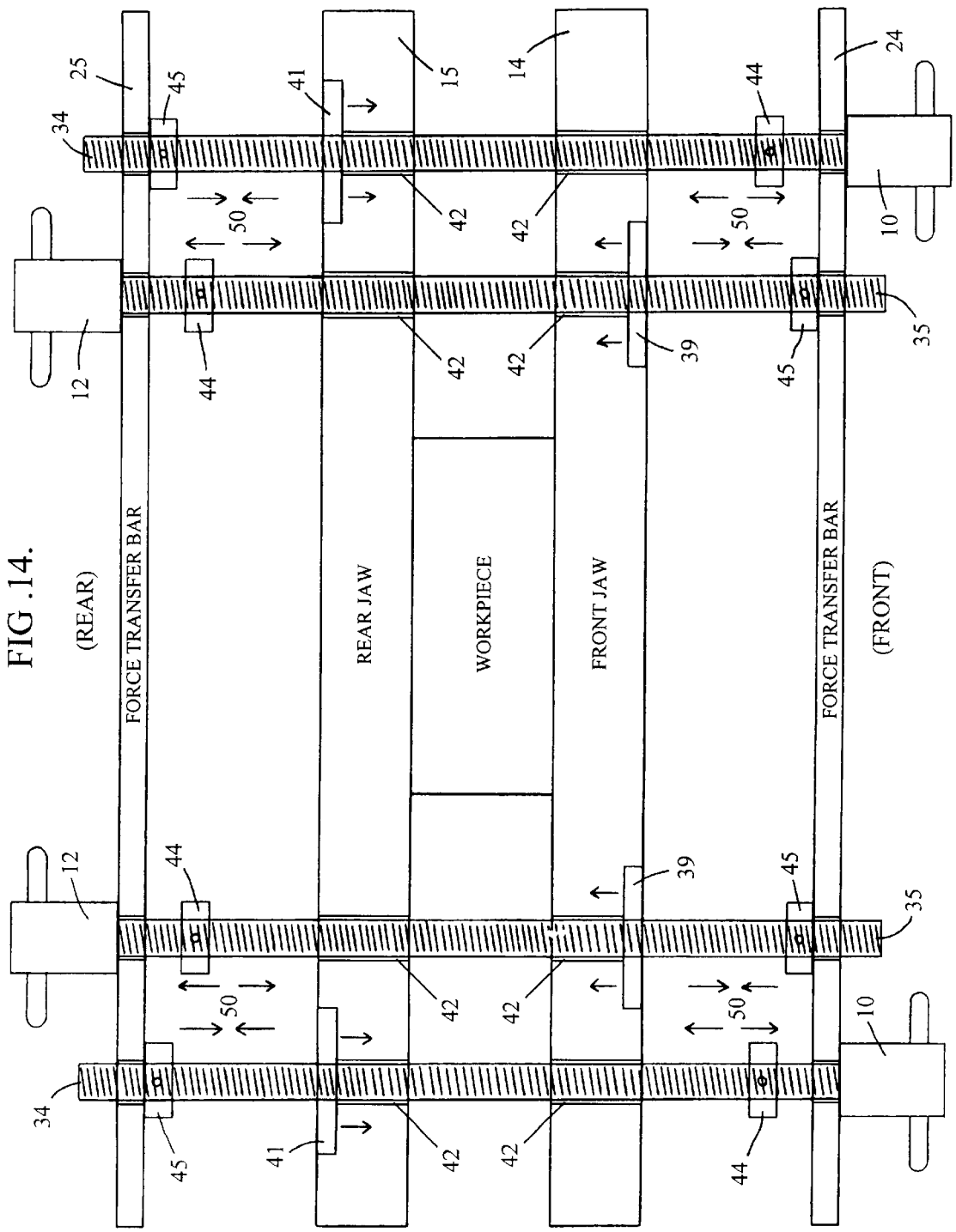
FIG. 14 shows a representational view of the double acting clamp assembly of the present invention.

Now referring to FIG. 14, a diagram shows the basic principle of the double acting clamp assembly of the present invention. The primary task of the front and rear clamp jaws 14, 15 is to hold the workpiece tightly and securely, but they also enable the workpiece to be centered in the work area defined by the large rectangular hole 2 (as shown in FIG. 2A). The front handles 10 are attached to the outer threaded rods 34 which pass through clearance holes in the front and rear force transfer bars 24, 25, as well as through the loose clearance holes 42 in the front and rear clamp jaws 14, 15. The rear jaw plates 41, which are attached to the rear clamp jaw 15, each have a threaded hole in them to engage the outer threaded rods 34 so that the position of the rear clamp jaw 15 is controlled by means of the front handles 10. The rear handles 12 are attached to the inner threaded rods 35, which pass through clearance holes in the front and rear force transfer bars 24, 25, as well as through the loose clearance holes 42 in the front and rear clamp jaws 14, 15. The front jaw plates 39, which are attached to the front clamp jaw 14, each have a threaded hole in them to engage the inner threaded rods 35 so that the position of the front clamp jaw 14 is controlled by means of the rear handles 12. The outer threaded rods 34 pass through clearance holes in the front jaw plates 39, and the inner threaded rods 35 pass through clearance holes in the rear jaw plates 41.

Still referring to FIG. 14, the limit collars 44 located on all of the threaded rods 34, 35 serve to limit any excess movement of the threaded rods 34, 35, as well as of the front and rear jaws 14, 15. The compression collars 45, located near the far ends of the outer threaded rods 34, are precisely positioned so that each will contact the rear force transfer bar 25 exactly when its associated front handle 10 contacts the front force transfer bar 24. Similarly, the compression collars 45, located near the far ends of the inner threaded rods 35, are precisely positioned so that each will contact the front force transfer bar 24 exactly when its associated rear handle 12 contacts the rear force transfer bar 25. This means that, effectively, if any handle is pushed against its force transfer bar, it will at the same time push its compression collar 45 against the other force transfer bar.

In summary, the double action clamp assembly locks into place when the front and rear clamp jaws 14, 15 tighten against the workpiece. When a front handle 10 is tightened, it pushes against the front force transfer bar 24, and pulls the rear jaw plate 41 and the rear jaw 15 toward it, so that the threaded rod 34 between them goes into a state of tension. At the same time, the associated compression collar 45 pushes against the rear force transfer bar 25, and the section of the threaded rod 34, between the compression collar 45 and the rear jaw plate 41, goes into a state of compression. The rear handles 12 perform exactly the same function with the threaded rods 35, but in the opposite direction. This results in tension and compression forces 50 that are equal in each of the four corners of the double acting clamp assembly. Effectively, these forces cancel out at the force transfer bars 24 and 25. Consequently, the clamping action is completely self-contained, and is not dependent in any way on the mounting base for the transfer of any force.

Because the threaded rods 34, 35 pass through the middle at each end of the clamp jaws 14, 15, the clamping action is balanced. This ensures that there is no tendency for the clamp jaws 14, 15 to twist when tightened fully onto the workpiece. Preferably, the front and rear force transfer bars are channel-shaped to resist any bending action.

The workpiece can be repositioned towards the front of the working region by loosening the two rear handles 12, and then tightening the two front handles 10. To position the workpiece towards the rear of the working area, the reversed procedure can be followed. In addition, the workpiece can be removed and replaced at any time by loosening and tightening the front handles 10 only. This way, the workpiece will always retain its front to rear position.

Figure 15:
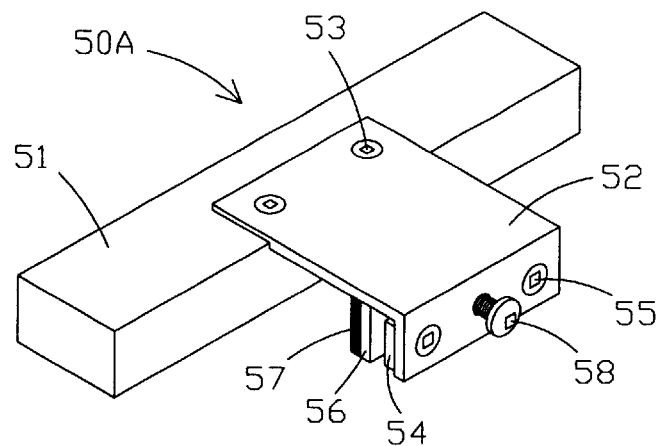
FIG. 15 shows an isometric view of a fence range extender.
Figure 15A:
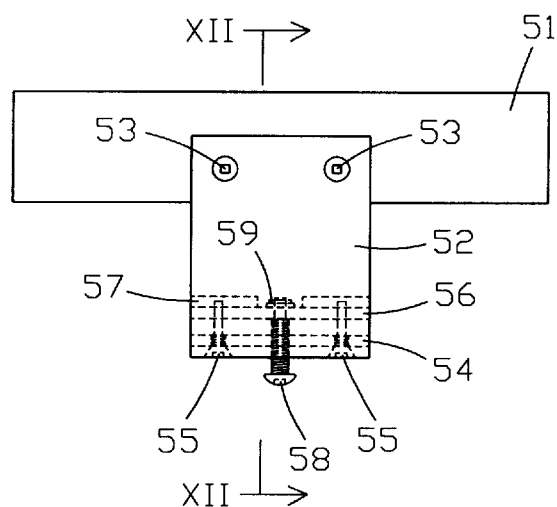
FIGS. 15A–15C show a top view, front view, and end view, respectively, of the fence range extender shown in FIG. 15.
Figure 15B:
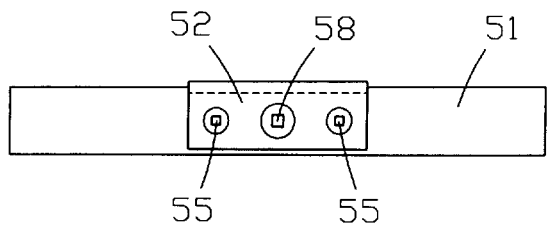
Figure 15C:
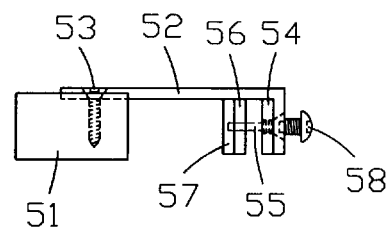
Figure 15D:
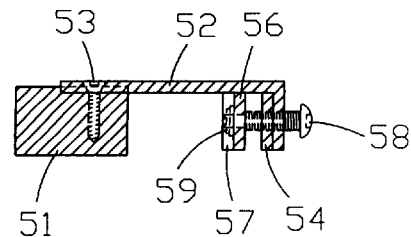
FIG. 15D shows a cross-sectional side view of the fence range extender taken along the line XII—XII indicated in FIG. 15A.

Now referring to FIGS. 15, and 15A–15D, a fence range extender 50A is shown which extends the forward reach of one of the adjustable fences 6. An angle bracket 52 fits into a partial recess in the top of a fence block 51. The angle bracket 52 and fence block 51 are fastened together by means of flat-headed wood screws 53. Located inside the front section of the angle bracket 52 is a steel plate 54, which is fastened to the angle bracket 52 by means of special flat-headed machine screws 55 that have small diameter pin extensions on them, as best shown in FIG. 15C. At each end of the clamping plate 56 are guide holes that slide along the small diameter pin extensions of the special flat-headed machine screws 55. A special round-headed machine screw 58 is screwed into a threaded hole in the center of the steel plate 54. The threaded hole in the steel plate 54 has a matching clearance hole in the front section of the angle bracket 52. The special round-headed machine screw 58 has been machined so that it has a small diameter pin extension with a circlip groove in it. The small diameter pin extension of the round-headed machine screw 58 passes through a matching clearance hole in the center of the clamping plate 56. A washer and circlip 59 are then installed to link them together (FIG. 15D). Finally, rubber pads 57 are glued onto the forward side of the clamping plate 56 to act as buffers.

Figure 16:
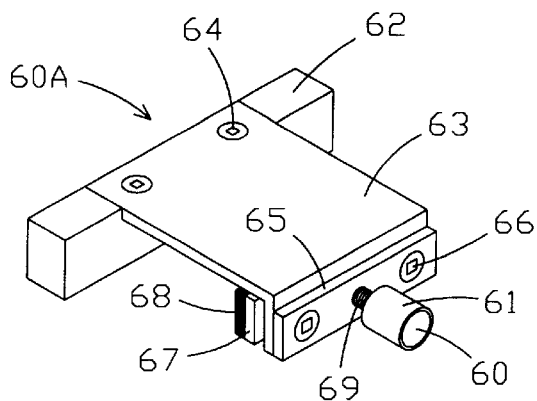
FIG. 16 shows an isometric view of a reference stop.
Figure 16A:
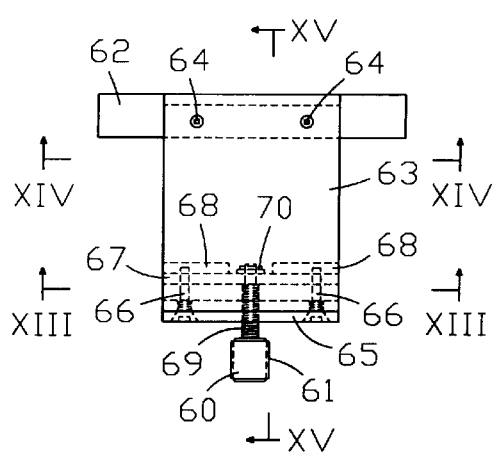
FIGS. 16A–16C show a top view, side view, and front view, respectively, of the reference stop shown in FIG. 16.
Figure 16B:
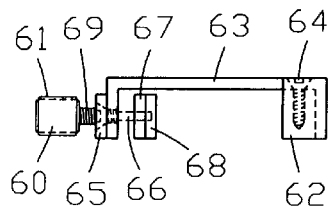
Figure 16C:
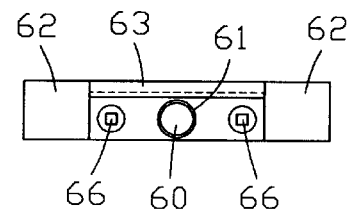
Figure 16D:
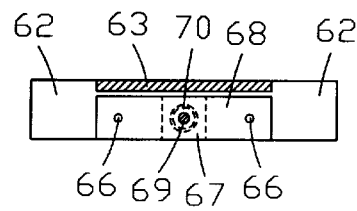
FIG. 16D shows a cross-sectional front view of the reference stop taken along the line XIII—XIII indicated in FIG. 16A.
Figure 16E:
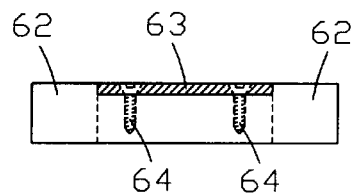
FIG. 16E shows another cross-sectional front view of the reference stop taken along the line XIV—XIV indicated in FIG. 16A.
Figure 16F:
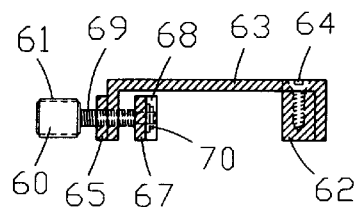
FIG. 16F shows a cross-sectional side view of the reference stop taken along the line XV—XV indicated in FIG. 16A.
Figure 19A:
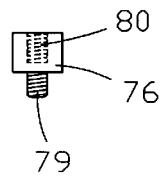
FIGS. 19A–19C show side views of various lengths of platform height extenders.
Figure 19B:
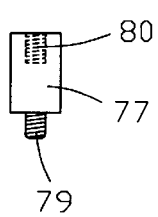
Figure 19C:
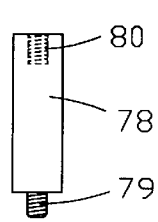
Figure 19D:
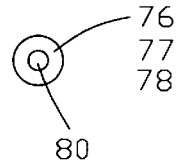
FIG. 19D shows a top view of any of the platform height extenders shown in FIGS. 19A–19C.
Figure 19E:
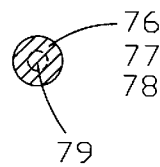
FIG. 19E shows a cross-sectional top view of any of the platform height extenders shown in FIG. 19A–19C.

Now referring to FIGS. 16 and 16A–16F, a reference stop 60A is shown which can be installed in any location on either of the masterguide clamp jaws 14, 15. The reference stop 60A has a very low profile so that it will fit underneath the working platform 110 without causing obstruction. A channel-shaped bracket 63 is recessed into the top and the rear of a reference block 62. The channel-shaped bracket 63 and the reference block 62 are fastened together by means of flat-headed wood screws 64. Located outside on the front of the channel-shaped bracket 63 is a steel plate 65 which is fastened onto the channel-shaped bracket 63 by means of two special flat-headed machine screws 66 which have small diameter pin extensions on them as best shown in FIG. 16B. A clamping plate 67 is positioned opposite the steel plate 65. The clamping plate 67 includes two guide holes which slide along the small diameter pin extensions of the special flat-headed machine screws 66. An adjustment screw 69 is screwed into a threaded hole in the center of the steel plate 65. The threaded hole in the center of the steel plate 65 has a matching clearance hole in the channel-shaped bracket 63. Attached to the adjustment screw 69 is an adjustment knob 60 which has tight-fitting rubber tubing 61 around it for better grip. The other end of the adjustment screw 69 has been machined so that it has a small diameter pin extension with a circlip groove in it as best shown in FIG. 16A. The small diameter pin extension of the adjustment screw 69 passes through a matching clearance hole in the center of the clamping plate 67. A washer and circlip 70 are then installed to link the adjustment screw 69 to the clamping plate 67. Finally, rubber pads 68 are glued onto the clamping side of clamping plate 67 to act as buffers.

Now referring to FIGS. 17 and 17A–17C, a long mount 71 is shown. FIGS. 23 and 24 show a pair of long mounts 71 being used to support a workpiece so that the workpiece is mounted evenly between the clamp jaws 14, 15. The long mounts 71 fit down between the inner threaded rods 35 and rest on top of the two clamp mounting blocks 27. The long mounts support the workpiece so that it is held by only the upper half of the clamp jaws 14, 15 and such that, if it were long enough and horizontally mounted, the underside of the workpiece would just clear the tops of the four threaded rods 34, 35 without touching them. Also, if the workpiece is very narrow, only one long mount 71 is required between the clamp jaws 14, 15. The notch 72 provides clearance for equalizing plates which will be described in further detail below. Note that the long mounts 71 only provide support for the workpiece and are not part of the clamping action.

Figure 25:
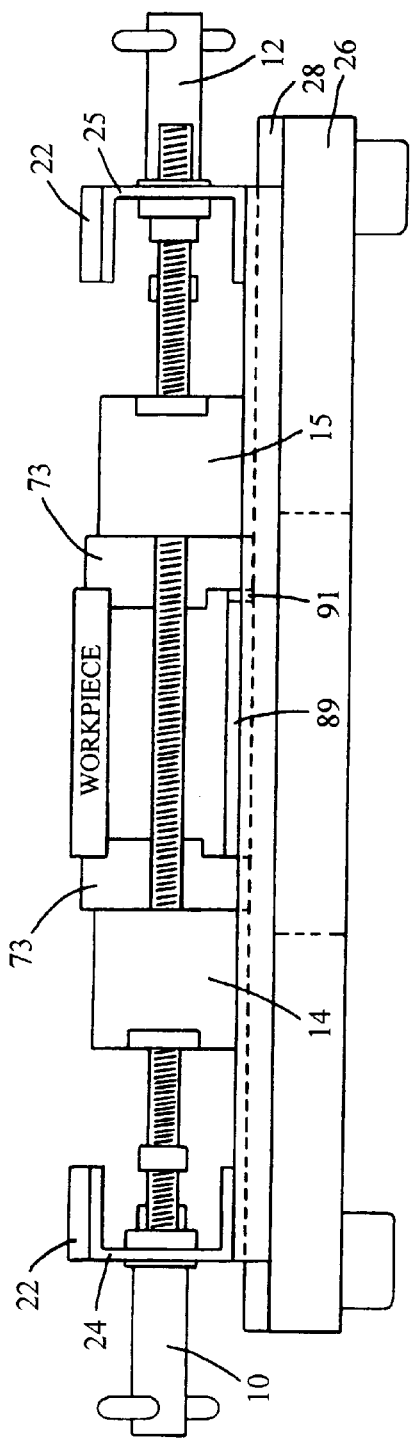
FIG. 25 shows short mounts being used to clamp a relatively thin workpiece.
Figure 26:
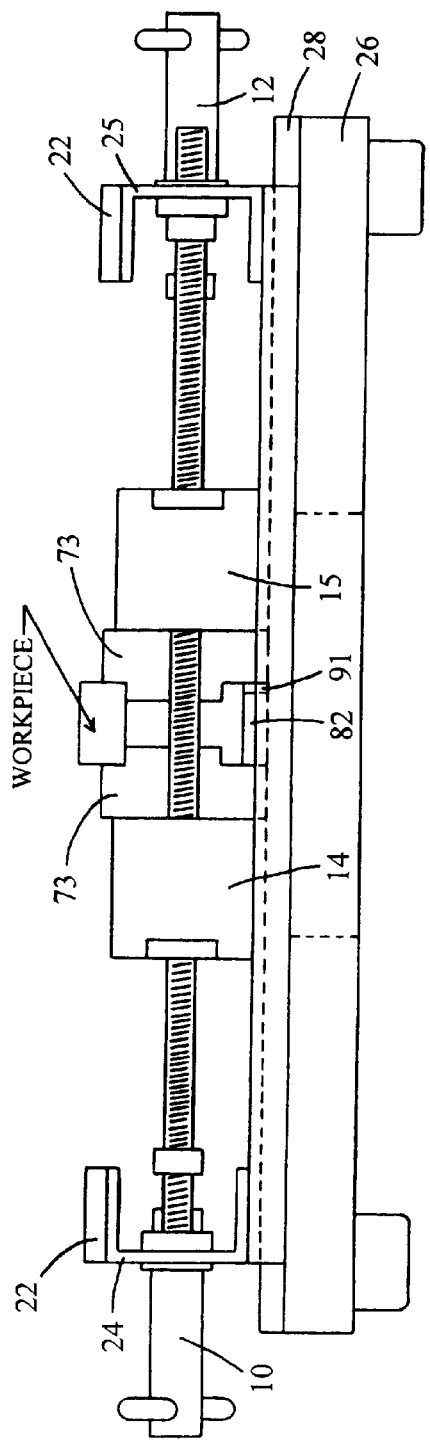
FIG. 26 shows the short mounts being used to clamp a very small workpiece.

Now referring to FIGS. 18 and 18A–18C, a short mount 73 is shown. FIGS. 25 and 26 show a pair of short mounts 73 being used to support very thin or very small workpieces. As shown in FIGS. 25 and 26, the workpieces are mounted evenly by resting them on each shallow shelf 74. Alternatively, the short mounts 73 can be turned the other way up so that the workpieces will fit evenly, but lower down, by resting on each deeper shelf 75. Whichever shelf 74, 75 is facing downwards will accommodate equalizing plates to be described in further detail below. In the case of the short mounts 73, they are part of the clamping action.

Now referring to FIGS. 19A–19E, platform height extenders are shown. When it is necessary to raise the working platform 110 higher above the base unit 120, either to accommodate thicker workpieces horizontally or to provide greater clearance above the clamp jaws 14, 15, the height extenders 76, 77, 78 can be used. Each size of platform height extender 76, 77, 78 operates as a set of four which have screw ends 79 that screw directly into threaded holes 19 in the four attachment plates 22 of the base unit 120 (shown in FIGS. 2A and 3). Either used separately or in combination, these platform height extenders 76, 77, 78 allow the working platform 110 to be raised in ½" steps up to 3½" above the standard height. The working platform 110 is then fastened to the platform height extenders 76, 77, 78 by means of the four screw knobs 5 which screw into threaded holes 80, as shown in FIG. 24. Optionally, the platform height extenders, 76, 77, 78 can be knurled or hexagonal in shape for better grip.

Figure 20:
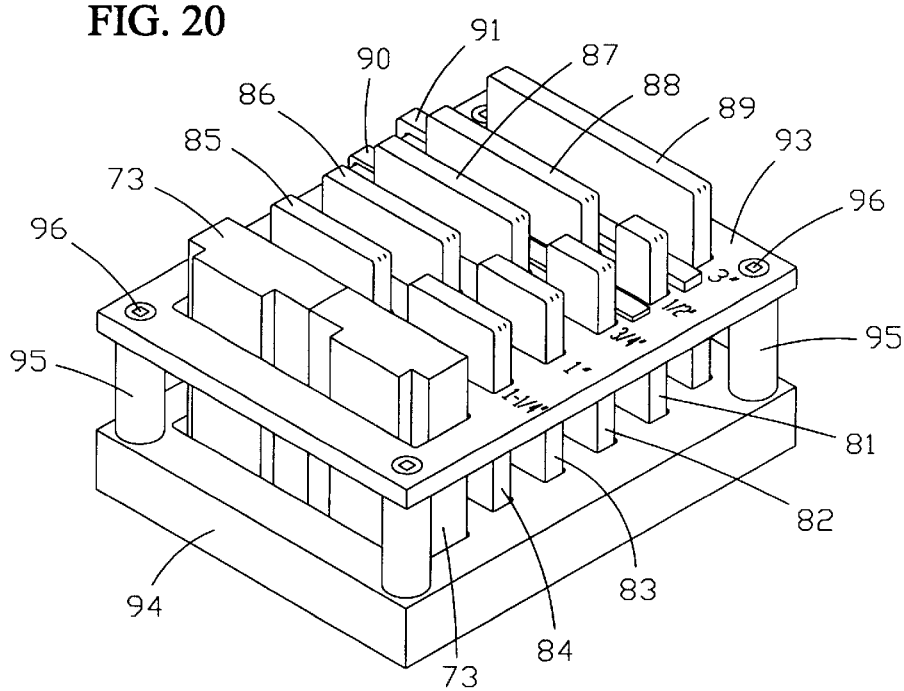
FIG. 20 is an isometric view of an equalizing plate set.
Figure 20A:
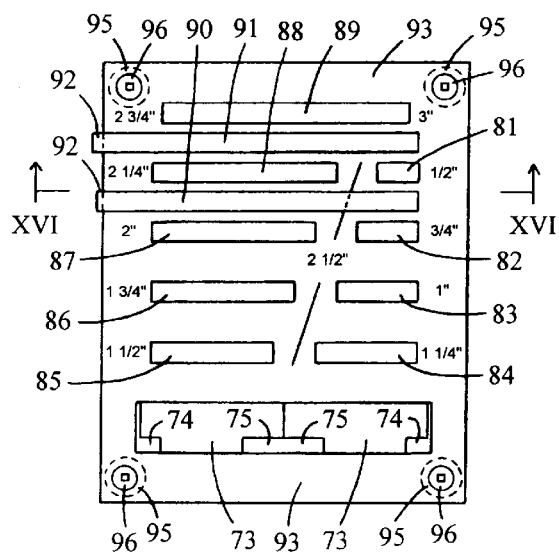
FIGS. 20A–20C show a top view, side view, and front view, respectively, of the equalizing plate set shown in FIG. 20.
Figure 20B:
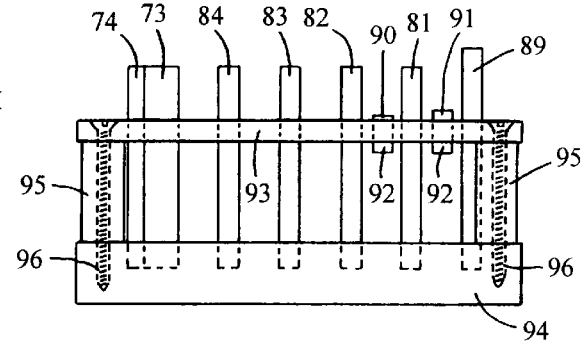
Figure 20C:
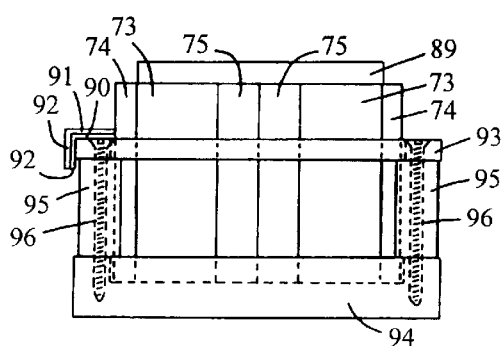
Figure 20D:
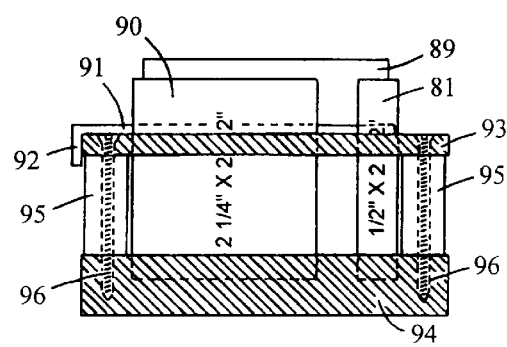
FIG. 20D shows a cross-sectional front view of the equalizing plate set taken along the line XVI—XVI indicated in FIG. 20A.

Now referring to FIGS. 20 and 20A–20D, whenever a workpiece is to be held in the masterguide by means of only the upper half of the clamp jaws 14, 15 (such as when the long mounts 71 or short mounts 73 are used) then the holding power of the double action clamp assembly would be compromised due to the twisting action that would take place, unless some form of equalization is applied to the lower half of the clamp jaws 14, 15. In the present invention, this is done by placing an equalizing plate which has the same clamping width as the workpiece onto the removable tray 28 in between the two clamp jaws 14, 15. A typical equalizing plate 89 is shown in FIGS. 21A–21C, which can be used in either direction to provide equalization of 2¾" or 3". A whole series of equalizing plates can be made in this manner to cover the complete range of clamping widths from ½" up to 6" in steps of ¼". Various other sizes of equalizing plates 81–88 are shown in FIG. 20. FIGS. 23 and 24 show equalizing plates 83 and 89 being used, respectively.

For clamping widths that fit in between each ¼" step an equalizing shim 91 (shown in FIGS. 20 and 22A–22C) can be used in conjunction with an equalizing plate 81–89, as shown in FIGS. 25 and 26. The equalizing shim 91 has a ⅛" thickness and is bent at one end 92 for ease of handling, and also to stand on its edge. A thinner equalizing shim 90 (shown in FIG. 20), which is ¹⁄₁₆" thick, is also provided so that one or both equalizing shims 90, 91 can be used in conjunction with an equalizing plate 81–89 to enable the complete range of clamping width to be covered in steps of ¹⁄₁₆".

For convenience, the small equalizing plates 81–89 can be stored in a slotted stand that would fit into a suitable box. The slotted stand, as shown in FIGS. 20 and 20A–20D, includes all of the equalizing plates 81–89 that cover the range from ½" up to 3". Also included in the set are the two equalizing shims 90–91 as well as the two short mounts 73. The slotted stand comprises a slotted upper panel 93 and a matching recessed base 94. The slotted upper panel 93 and recessed base 94 are fastened together by means of flat-headed wood screws 96 in conjunction with four spacers 95. In order to span an adequate length of each clamping jaw 14, 15, all equalizing plates 81–89 have at least one dimension which is equal to or greater than 2½". There are six larger equalizing plates (not shown) that cover the range from 3¼" up to 6". These larger equalizing plates can be stored with the long mounts 71 in a separate box.

Figure 27:
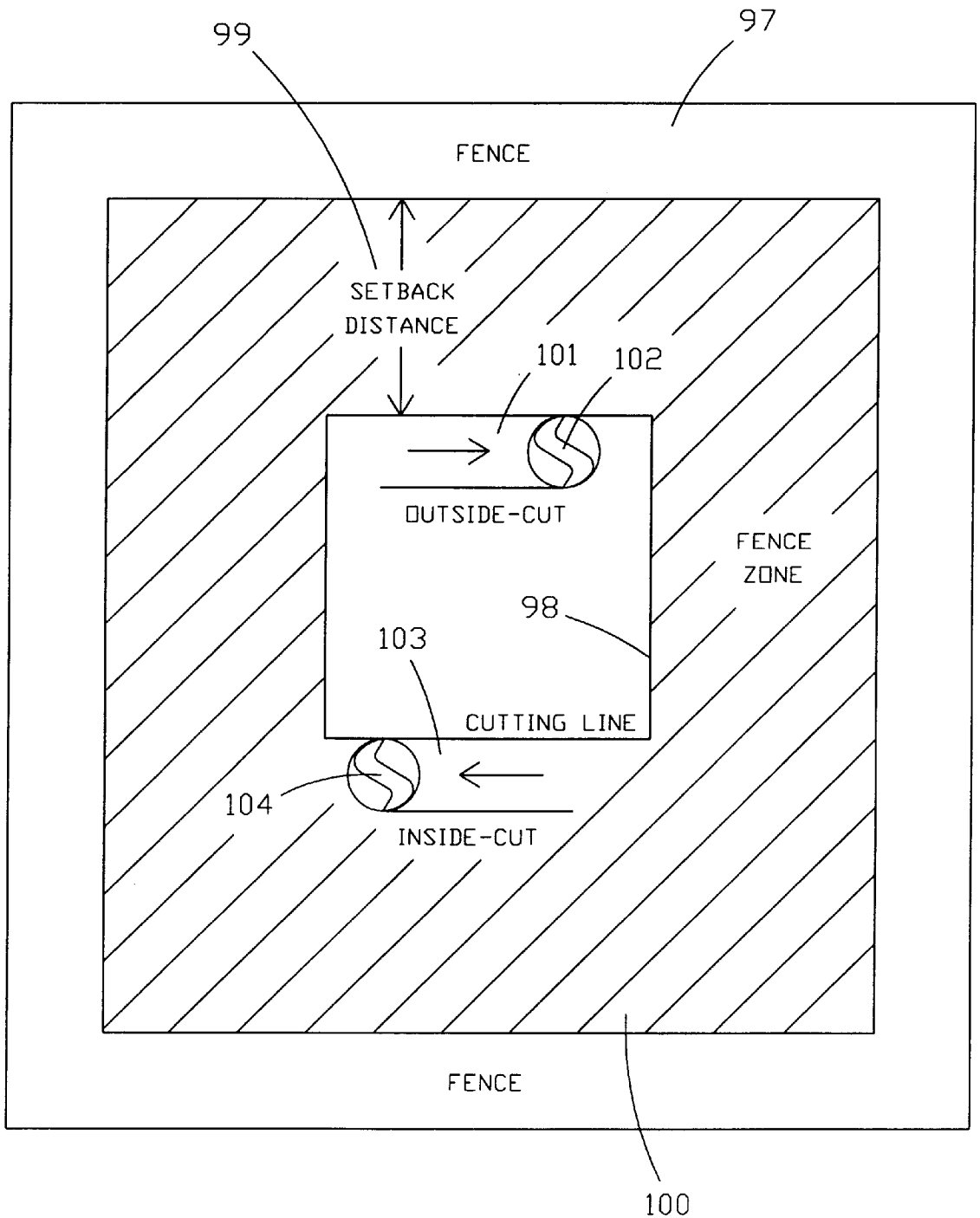
FIG. 27 illustrates the concept of outside cuts and inside cuts used in conjunction with the present invention.

Now referring to FIG. 27, the principle of operation for using the masterguide is illustrated, with the four adjustable fences 6 being represented by the rectangular border 97, and the cutting line 98 representing the proposed rectangle that is to be routed on the workpiece. The four fences 97 of the masterguide each have to be positioned a specific distance away from the cutting line 98 on the workpiece. This distance can be referred to as the setback distance 99. The area that lies between the four fences 97 of the masterguide and the cutting line 98 can be called the fence zone 100 which is shown as a shaded area in FIG. 27.

If a groove 101 cut by a router bit 102 is required to be on the side of the cutting line 98 that is not inside the fence zone 100, then it is called an "outside cut". However, if another groove 103 cut by another router bit 104 is required to be on the side of the cutting line 98 that is inside the fence zone 100, then it is called an "inside cut". Actual routing should always be done in a clockwise direction around the four fences of the masterguide, regardless of whether it is to be an "outside cut" or an "inside cut". Furthermore, all cuts in the workpiece should be routed not more than ⅛" at a time, until the required depth is reached.

"Outside cuts" are used for the routing of grooves, slots, holes, and recesses in a workpiece. "Outside cuts" can also be used for routing rabbets if desired. For "outside cuts", after the perimeter of any hole or recess has been routed in a clockwise direction, any remaining internal area that needs to be removed can then be routed in a random manner. Also, for routing grooves or slots that will have the same width as the diameter of the router bit, it will only require the use of one fence with perhaps two other fences to act as end stops.

"Inside cuts" are used for the routing of tenons, and they are also used for a preferred method of routing rabbets. Any type of tenon can be routed in one operation if the workpiece is mounted vertically in the masterguide, and all sides of the tenon are routed in turn, using "inside cuts". Four-sided tenons will require the use of all four fences, each fence being set back the appropriate distance from the cutting line on the workpiece. Two-sided tenons will require the use of two opposing fences, each being set back the appropriate distance from the cutting line of the workpiece. The other two fences are set back out of the way, so that the router bit can move completely off the workpiece at each end of the tenon. Whenever fences are set back out of the way, they should be set at their safeguard positions. This means that the fences are set so that they will prevent the router bit of the router from getting too close to the edges of the working area, and risking damage to the working platform 110.

Three-sided tenons will require the use of three fences, each fence being set back at an appropriate distance from the cutting line on the workpiece, with the fourth fence being set back to its safeguard position. The actual routing for "inside cuts" will preferably be done using a large diameter router bit in the router, say ¾". The routing is done in a clockwise direction, inside the four fences, to cut each side of the tenon in turn. When cutting tenons using an "inside cut", the base of the router must be held against each fence in turn to prevent any damage to the tenon being routed. This is not difficult because there is a natural tendency for the router to move towards each fence due to the torque from the router bit. An additional advantage to using "inside cuts" for making tenons is that the router bit uses an inward cutting action to rout each side of the tenon, which virtually guarantees that no breakouts will occur.

If a shelf is required on the tenon, this can be accomplished without requiring any further adjustment of the fences by placing a fence buffer (essentially a block of wood measuring ¾"×¾"×5") against the fence where the shelf is required. That fence is adjusted prior to routing with a fence buffer in place. After the tenon has been routed, the fence buffer can be removed to rout the shelf region of the tenon.

In addition, rabbets can be routed using an "inside cut" to take advantage of an inward cutting blade to minimize the chance of breakouts. This is done by performing the routing operation using a right to left motion along the fence located in front of the rabbet being routed, instead of the usual left to right direction along a fence located behind the rabbet being routed using "outside cuts".

The masterguide is also capable of routerplaning the top surface of workpieces which are clamped between the jaws. In this case, all four of the adjustable fences 6 will be set back out of the way to their safeguard positions. A large diameter router bit, perhaps ¾" in diameter, should be used for routerplaning. The router is moved in a clockwise direction, with the router bit only partly on the workpiece, in order to rout the outside perimeter of the workpiece surface, and then the remaining area can be routed in a random manner. This method of routerplaning ensures that no breakouts will occur because the outside perimeter of the workpiece is routerplaned using an inward cutting action of the router bit.

As described earlier, the working platform 110 can be raised if necessary by means of platform height extenders 76, 77, 78, to enable thicker workpieces to be mounted horizontally in the masterguide. Also, by raising the working platform 110, more clearance is provided between the router bit and the clamp jaws, thus avoiding the possibility of the clamp jaws being damaged. Thinner workpieces, on the other hand, can be clamped securely by means of the long mounts 71 or short mounts 73 described earlier, with or without raising the working platform 110, depending on the type of cut that is to be made. Whenever a fence 6 is required to be positioned such that it will control the routing on a workpiece near the far side of the working area 2, then the fence range extender 50A (described earlier) can be attached to that fence 6 prior to it being adjusted. If a workpiece needs to be clamped and unclamped several times, the reference stop 60A described earlier can be installed at any desired location on either of the clamp jaws 14, 15 to provide a common reference point.

Longer workpieces can be vertically mounted on the masterguide by placing the masterguide over an open area. This can be done by placing the masterguide in a position to straddle two planks, or the open jaws of a portable folding bench, such as a Black & Decker Workmate™. Thus, the longer workpiece will project below the masterguide and in between the planks or the open jaws of a Workmate™.

In normal operation, the workpiece should be clamped so that its top surface is approximately flush with the top surface of the working platform 110. In some cases, this will not be possible (such as for long horizontally mounted workpieces) in which case, the workpiece should be made approximately flush with the bottom surface of the working platform 110. However, the top surface of the workpiece should never project above the top surface of the working platform 110 as it would interfere with the smooth operation of the router. Also, the proposed working area on the workpiece should be approximately centered in the middle of the working platform 110, by adjusting the front and rear handles 10, 12 of the masterguide. Unless it is required to be otherwise, the workpiece should be made square in the masterguide by ensuring that the clamp jaws 14, 15 are set squarely in the base unit 120. If the clamping jaws are not set squarely, this can be corrected by adjusting the front and rear handles 10, 12 on the right side only, or on the left side only, and by referencing the calibration marks on the clamp mounting blocks 27. If the front to rear location of the workpiece needs to remain unchanged, then the workpiece can be removed and installed using only the two front handles 10 of the base unit 120.

All adjustments to the fences of the masterguide can be easily made, both for "outside cuts" and "inside cuts", and for all sizes of router bits, by means of the setback gauges described in the inventor's co-pending patent application Ser. No. 09/207,759.

The maximum working area possible with the exemplary embodiment described in this patent specification is 4¼"× 4¼", which requires a rectangular hole in the working platform 110 of 4½"×4½". With this size of rectangular hole in the working platform 110, any tipping action that might occur (when using a standard 6" diameter hand-held router) would tend to lift the blade of the router away from the workpiece surface. If the rectangular hole in the working platform 110 were made any larger than this size, any router tipping action that might occur could then also tend to let the blade of the router cut deeper into the workpiece surface. However, it is possible to make a larger version of the masterguide that would have a working area of 6¼"×6¼", and a rectangular hole measuring 6½"×6½", which would be suitable for a standard 8" diameter hand-held router.

While the particular embodiment of the present invention has been illustrated and described, it would be obvious to those skilled in the art that various other changes and modifications can be made without departing from the spirit and scope of the invention. It is therefore intended to cover in the claims all of such changes and modifications that are within the scope of this invention.

What is claimed is:

1. An apparatus, for use with a portable router having a base and a router bit extendable from said base, the apparatus comprising:

(1) a working platform having a platform area for slidably supporting a router base thereon and defining an opening for access, in use, to a workpiece;

(2) a base unit secured to the working platform, underneath the working platform, and including clamping means comprising a pair of opposed and adjustable clamping jaws, each of which is movable relative to the working platform, for securing said workpiece in the base unit in one of a plurality of lateral positions relative to the opening in the working platform; and (3) a fence means on the working platform and including at least one adjustable fence for guiding the router base on the platform area.

2. An apparatus as claimed in claim 1, wherein the fence means comprises a plurality of adjustable fences positionable around the opening, for guiding a router on any side of a workpiece.

3. An apparatus as claimed in claim 2, wherein the opening is generally rectangular and the fences comprise four fences, each located with respect to one side of the rectangular opening.

4. An apparatus as claimed in claim 1, wherein the opening in the working platform includes a front edge and a rear edge, wherein the clamping jaws comprise a front clamping jaw and a rear clamping jaw and wherein the clamping means includes screw means engaging the front and rear clamping jaws, for displacing the front clamping jaw away from the front edge and the rear clamping jaw away from the rear edge, to clamp a workpiece.

5. An apparatus as claimed in claim 4, wherein the screw means comprises, for each of the clamping jaws, a pair of threaded rods rotatably mounted in the base unit and engaging threaded bores in the corresponding clamping jaw for movement thereof.

6. An apparatus as claimed in claim 5, wherein the screw means comprises a first pair of parallel threaded rods engaging the rear clamping jaw and including adjustment handles at the front of the apparatus, and a second pair of threaded rods engaging the front clamping jaw, parallel to one another and to the first pair of threaded rods, and including adjustment handles at the rear of the apparatus.

7. An apparatus as claimed in claim 6, wherein the first pair of parallel threaded rods are located outside of the second pair of parallel threaded rods, and all of the parallel threaded rods are located generally coplanar and below the working platform.

8. An apparatus as claimed in claim 7, wherein each of the clamping jaws is generally rectangular, the front clamping jaw includes clearance holes for passage of the first pair of threaded rods and the rear clamping jaw includes clearance holes for passage of the second pair of threaded rods.

9. An apparatus as claimed in claim 8, wherein the base unit comprises a base plate and front and rear force transfer bars secured thereto, wherein the working platform is secured on top of the force transfer bars.

10. An apparatus as claimed in claim 9, wherein the front handles include bearing surfaces for abutting the front force transfer bar, the rear handles include bearing surfaces for abutting the rear force transfer bar, the first pair of threaded rods include compression collars for abutting an inside surface of the rear force transfer bar and the second pair of threaded rods includes compression collars for abutting an inside surface of the front force transfer bar, the compression collars being adjusted so that loads applied to the threaded shafts from the clamping jaws are distributed by the handles and the compression collars between the front and rear force transfer bars.

11. An apparatus as claimed in claim 1, wherein the base unit includes an opening corresponding to the opening in the working platform, and wherein the apparatus includes a removable tray which covers the opening in the base unit so as to provide a platform for equalizing plates, said equalizing plates being used to clamp a workpiece which is held between the upper half of said clamp jaws, said equalizing plates being substantially equal to the width of said clamped workpiece and exerting a force on the bottom half of said clamp jaws so as to avoid any vertical twisting forces on said clamp jaws.

12. An apparatus as claimed in claim 1 further including a workpiece mount for mounting a small workpiece, said workpiece mount comprising two rectangular blocks having a recessed shelf at the top and bottom of one side, wherein said small workpiece is held between said workpiece mounts at said top recessed shelf and an equalizing plate of a substantially similar width is held between said workpiece mounts at said bottom recessed shelf.

13. An apparatus as claimed in claim 11 further including equalizing shims to be used in conjunction with said equalizing plates, said equalizing shims providing a fine width adjustment to match the width of said clamped workpiece.

14. An apparatus as claimed in claim 1, wherein the working platform is separable from the base unit and includes securing means for securing the working platform to a large workpiece.

15. An apparatus as claimed in claim 14, wherein the securing means comprises a plurality of holes located around the perimeter of the platform area, to enable attachment of the platform area to the large workpiece.

16. An apparatus as claimed in claim 1 further comprising platform height extenders, said platform height extenders enabling the working platform to be raised incrementally above said base unit, so as to provide greater clearance between said working platform and said clamping means.

17. An apparatus as claimed in claim 1, further including at least one of:

(i) a fence range extender for extending a fence inwardly; and (ii) a reference stop for mounting on one of the clamping jaws.

18. An apparatus, for use with a portable router having a base and a router bit extendable from said base, the apparatus comprising:

(1) a working platform having a platform area for receiving a router base thereon and defining an opening for access, in use, to a workpiece; and (2) a base unit secured to the working platform, underneath the working platform, said base unit comprising a base plate with front and rear force transfer bars secured thereto, and including clamping means comprising:

(a) opposed front and rear clamping jaws;

(b) a first pair of threaded rods rotatably mounted in the base unit and engaging threaded bores in said rear clamping jaw for movement thereof, said front and rear force transfer bars and said front clamping jaw all including clearance holes for passage of said first pair of threaded rods; and (c) a second pair of threaded rods rotatably mounted in the base unit and engaging threaded bores in said front clamping jaw for movement thereof, said front and rear force transfer bars and said rear clamping jaw all including clearance holes for passage of said second pair of threaded rods;

whereby, in use, said workpiece is clamped between said front and rear clamping jaws.

19. The apparatus claimed in claim 18, wherein:

(1) said first pair of threaded rods includes front adjustment handles at the front of the base unit and said second pair of threaded rods includes rear adjustment handles at the rear of the base unit, said front and rear adjustment handles including bearing surfaces for abutting front and rear force transfer bars, respectively; and (2) said first pair of threaded rods further includes compression collars for abutting an inside surface of the rear force transfer bar and said second pair of threaded rods further includes compression collars for abutting an inside surface of the front force transfer bar, the compression collars being adjusted so that, in use, loads applied to the threaded rods from the clamping jaws are distributed by the handles and the compression collars between the front and rear force transfer bars.

* * * * *